Figure 1:
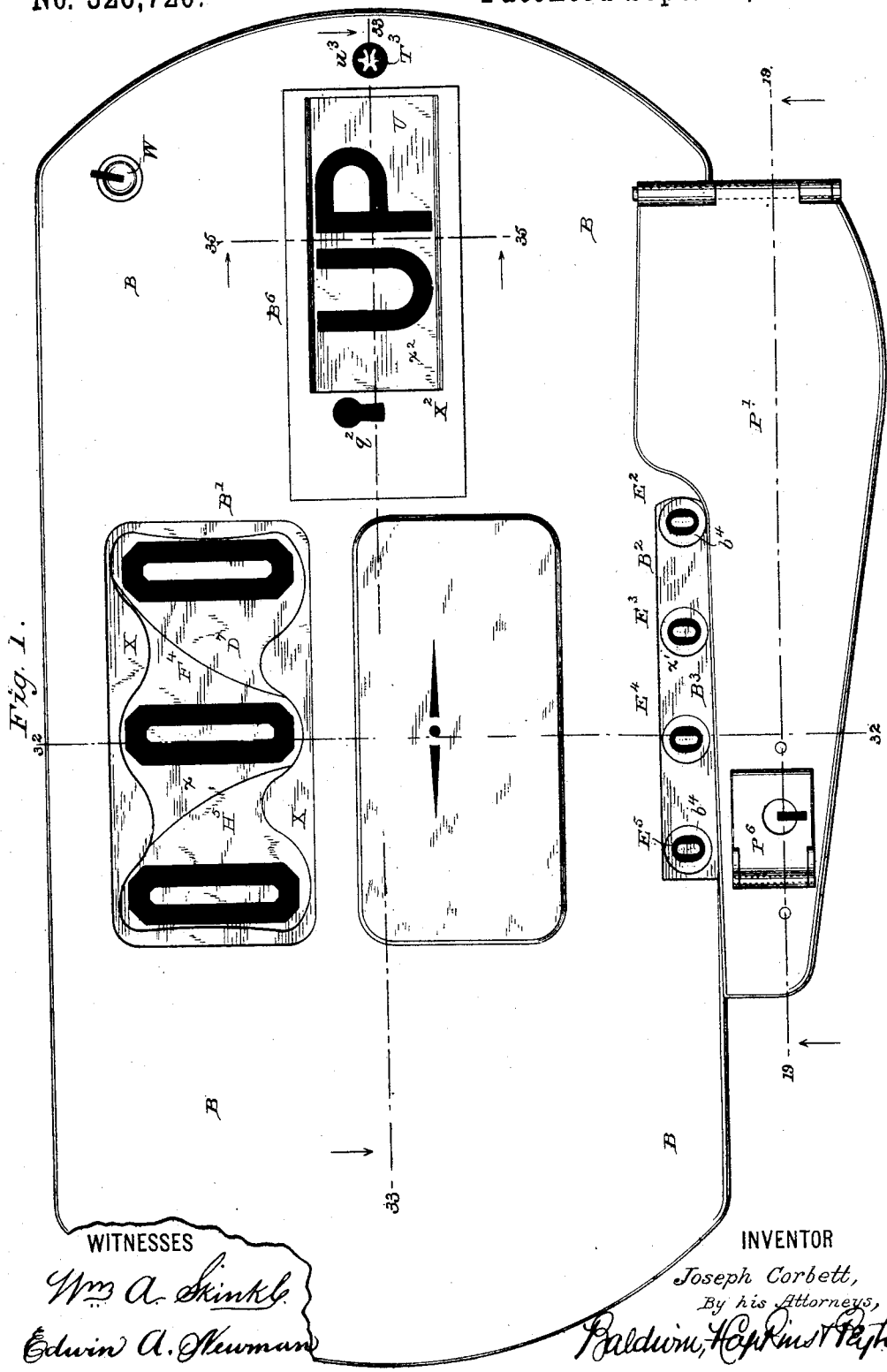

(Model.)

13 Sheets—Sheet 1.

J. CORBETT.
FARE REGISTER AND RECORDER.

No. 326,720. Patented Sept. 22, 1885.

WITNESSES
Wm A. Skinkle
Edwin A. Newman

INVENTOR
Joseph Corbett,
By his Attorneys,
Baldwin, Hopkins & Peyton.

(Model.)

13 Sheets—Sheet 2.

J. CORBETT.
FARE REGISTER AND RECORDER.

No. 326,720. Patented Sept. 22, 1885.

WITNESSES
Wm. A. Skinkle
Edwin A. Newman

INVENTOR
Joseph Corbett,
By his Attorneys
Baldwin, Hopkins & Peyton.

(Model.)

J. CORBETT.
FARE REGISTER AND RECORDER.

No. 326,720. Patented Sept. 22, 1885.

WITNESSES
Wm A. Skinkle
Edwin A. Newman

INVENTOR
Joseph Corbett,
By his Attorneys
Baldwin, Hopkins & Peyton (Model.)

13 Sheets—Sheet 4.

J. CORBETT.
FARE REGISTER AND RECORDER.

No. 326,720. Patented Sept. 22, 1885.

WITNESSES
Wm A. Skinkle
Edwin A. Newman

INVENTOR
Joseph Corbett,
By his Attorneys
Baldwin, Hopkins & Peyton (Model.)

13 Sheets—Sheet 5.

J. CORBETT.
FARE REGISTER AND RECORDER.

No. 326,720. Patented Sept. 22, 1885.

WITNESSES
Wm A. Skinkle.
Edwin A. Newman.

INVENTOR
Joseph Corbett,
By his Attorneys
Baldwin, Hopkins & Peyton.

(Model.)
13 Sheets—Sheet 6.
J. CORBETT.
FARE REGISTER AND RECORDER.
No. 326,720. Patented Sept. 22, 1885.
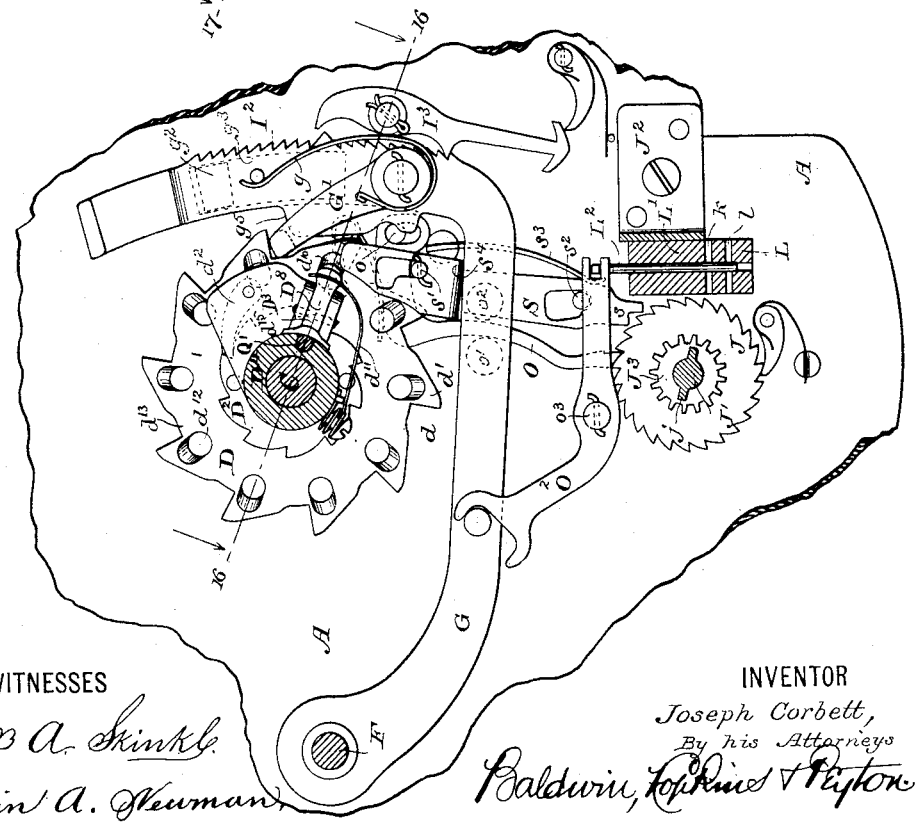
WITNESSES
Wm A. Skinkle
Edwin A. Neuman
INVENTOR
Joseph Corbett,
By his Attorneys
Baldwin, Hopkins & Peyton (Model.)

J. CORBETT.
FARE REGISTER AND RECORDER.

No. 326,720. Patented Sept. 22, 1885.

WITNESSES
Wm A. Skinkle
Edwin A. Neuman

INVENTOR
Joseph Corbett,
By his Attorneys
Baldwin, Hopkins & Peyton.

(Model.)
13 Sheets—Sheet 8.
J. CORBETT.
FARE REGISTER AND RECORDER.
No. 326,720. Patented Sept. 22, 1885.
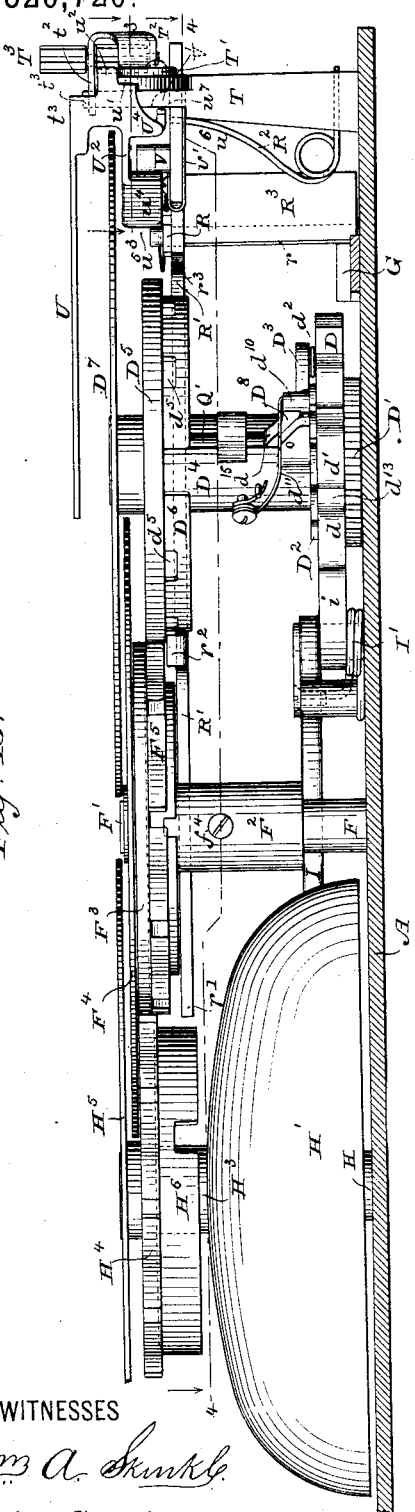
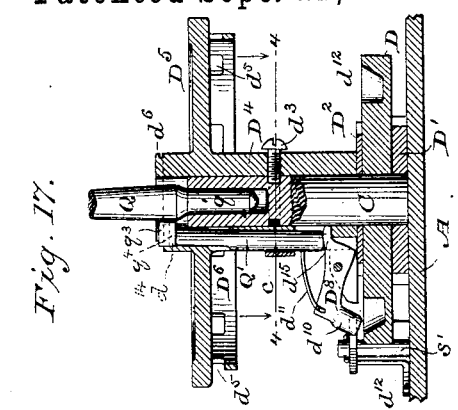
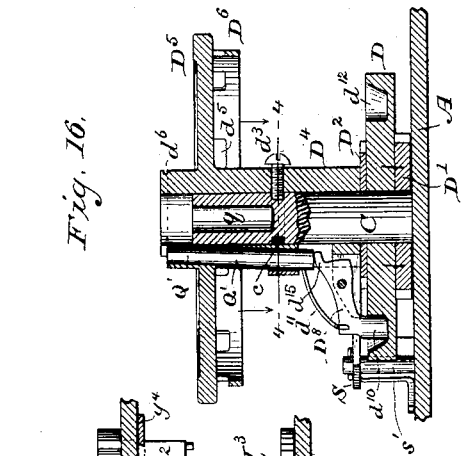
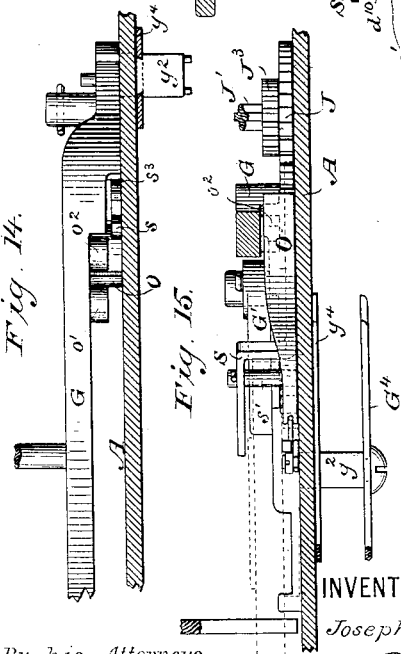
WITNESSES
Wm A. Skinkle
Edwin A. Newman
INVENTOR
Joseph Corbett,
By his Attorneys
Baldwin, Hopkins & Payton.

(Model.)
J. CORBETT.
FARE REGISTER AND RECORDER.
No. 326,720. Patented Sept. 22, 1885.
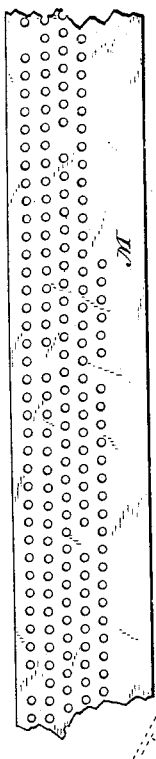
Fig. 18.
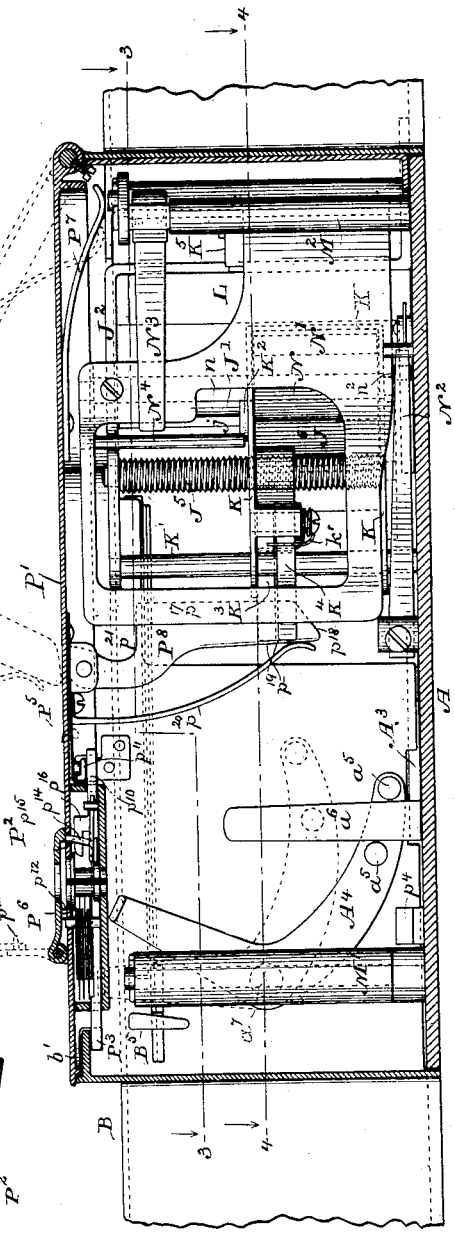
Fig. 19.
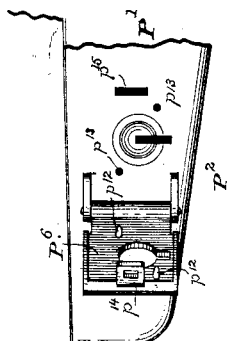
Fig. 19ª.
WITNESSES
Wm A. Skinkle
Edwin A. Newman
INVENTOR
Joseph Corbett,
By his Attorneys
Baldwin, Hopkins & Peyton.

(Model.)
13 Sheets—Sheet 10.
J. CORBETT.
FARE REGISTER AND RECORDER.
No. 326,720. Patented Sept. 22, 1885.
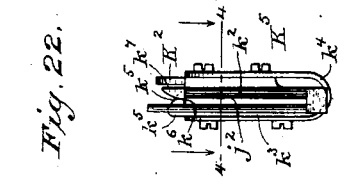
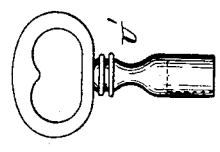
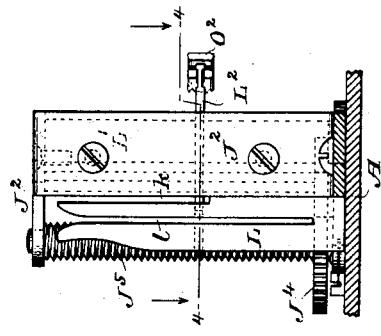
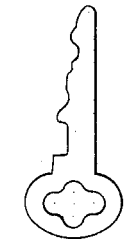
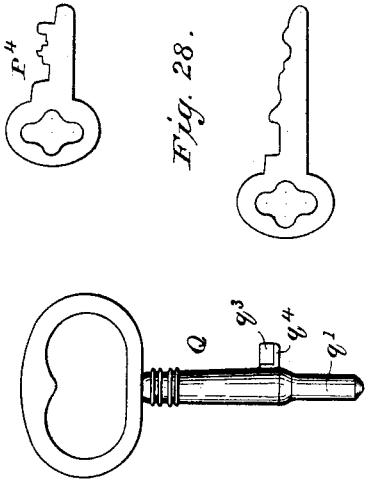
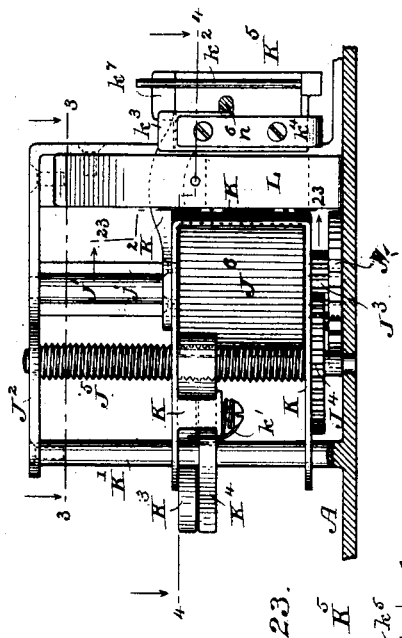
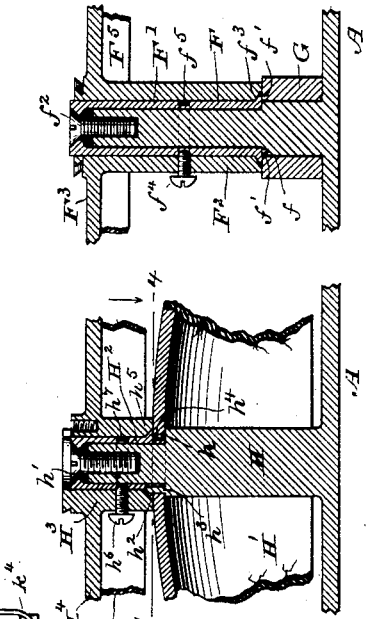
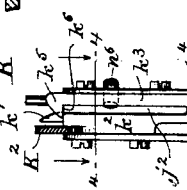
WITNESSES
Wm A. Skinkle
Edwin A. Newman
INVENTOR
Joseph Corbett,
By his Attorneys
Baldwin, Hopkins & Peyton.

(Model.)

13 Sheets—Sheet 11.

J. CORBETT.
FARE REGISTER AND RECORDER.

No. 326,720. Patented Sept. 22, 1885.

WITNESSES
Wm A. Skinkle
Edwin A. Newman

INVENTOR
Joseph Corbett,
By his Attorneys
Baldwin, Hopkins & Peyton.

(Model.)
J. CORBETT.
FARE REGISTER AND RECORDER.
No. 326,720. Patented Sept. 22, 1885.
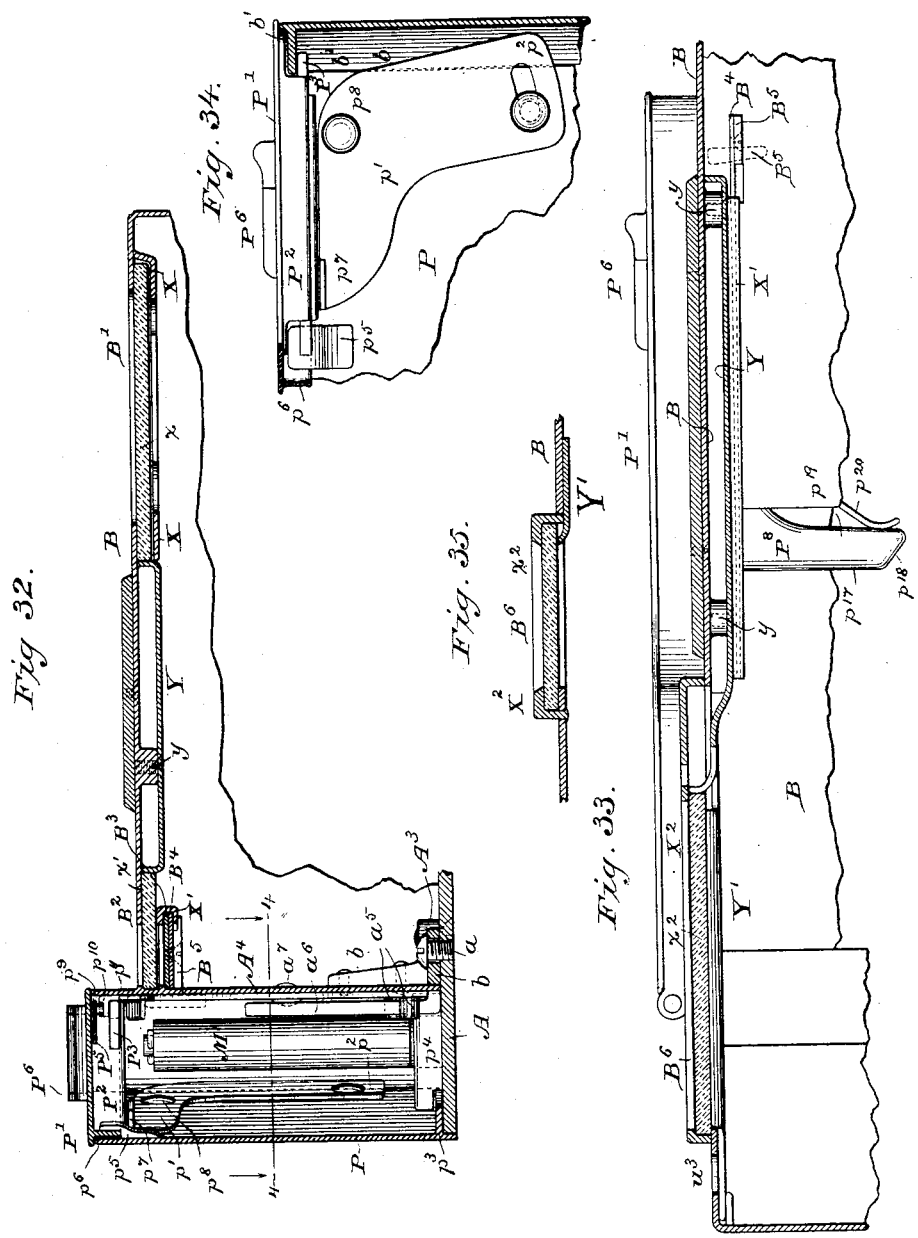
WITNESSES
Wm A. Skinkle
Edwin A. Neuman
INVENTOR
Joseph Corbett,
By his Attorneys
Baldwin, Hopkins & Peyton.

(Model.)  13 Sheets—Sheet 13.
J. CORBETT.
FARE REGISTER AND RECORDER.
No. 326,720.  Patented Sept. 22, 1885.
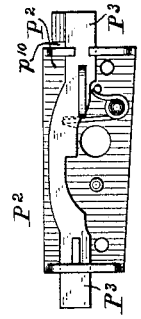
Fig. 19.b
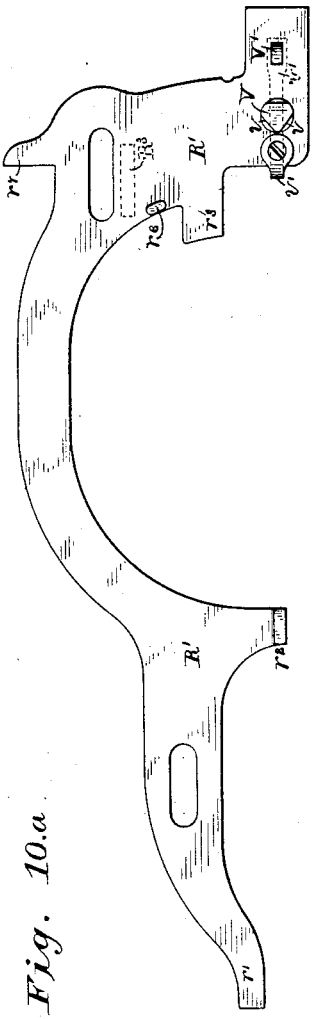
Fig. 10.a
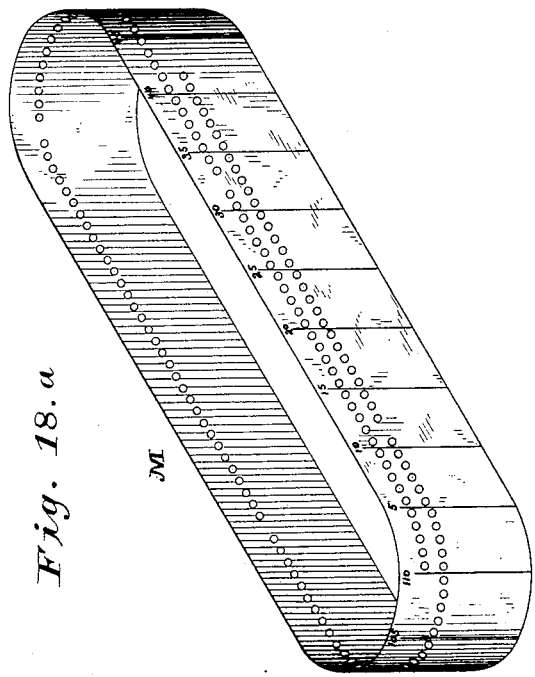
Fig. 18.a
WITNESSES
Ed. A. Newman,
Al. C. Newman.
INVENTOR
Joseph Corbett.
By his Attorneys
Baldwin, Hopkins & Peyton

UNITED STATES PATENT OFFICE.

JOSEPH CORBETT, OF NEW YORK, ASSIGNOR TO THE RAILWAY REGISTER MANUFACTURING COMPANY, OF BUFFALO, NEW YORK.

FARE REGISTER AND RECORDER.

SPECIFICATION forming part of Letters Patent No. 326,720, dated September 22, 1885.

Application filed September 1, 1883. (Model.)

*To all whom it may concern:*

Be it known that I, JOSEPH CORBETT, of the city, county, and State of New York, have invented certain new and useful Improvements in Registers, of which the following is a specification.

My present invention relates more particularly to registers employed for counting or tallying the fares received by conductors or collectors on passenger cars or vehicles. Such machines, as is well known, are provided for the use of the conductor, and the rules of the company or owners of the cars or vehicles require that as each fare is received the conductor or collector must operate the register to record or tally it; and to compel the conductor to operate the machine for each fare as it is received, so that a correct record or tally may be kept, the machine is provided with an alarm, which forms part of the machine and is connected with the registering devices. Upon the receipt of a fare and an actuation of the machine the alarm is sounded, and until such alarm is sounded the passengers or whoever may be in the car or vehicle know that the conductor has not registered the fare he may have received, and consequently has not properly performed his duty, and thus his dereliction or dishonesty is apparent and is soon brought to the attention of his employer, and thus the company or owner of the car or vehicle is enabled to discharge the dishonest employé and secure the services of another, who will properly and honestly account for the moneys or fares received by him in the discharge of his trust.

The machine is a check upon any conductor or collector who may be employed.

By the employment of these machines, if the type of machine is a good one, the fear of certain detection compels the conductor to be honest in many cases where he would otherwise be dishonest, and should he be dishonest exposes the dishonesty which may be attempted; consequently a much larger revenue is derived by the road or owners of the vehicle, and dishonesty and fraud prevented or exposed.

My present invention is an improvement more especially in fare-registering machines; and its objects generally are to throw more checks and safeguards around the conductor or collector than has heretofore been the case, and to provide a more efficient machine as a monitor upon his honesty, and thereby increase the receipts of the road using the machine.

The specific objects of my improvements and many of their advantages will sufficiently appear in the course of the following description of my improvements, and need not be here premised. The subject-matter claimed by me herein is also particularly pointed out at the close of this specification. I will premise, however, that my improvements are many and varied, and not confined in their use to registering-machines for fare-registering purposes. Some of my said improvements may be used without the others, and in machines differing in construction from that herein particularly described. So, also, in many instances the details of construction are immaterial, as they can be modified without departing from my invention. Many of my improvements, also, may advantageously be used in registering machinery for different purposes.

The machine about to be described as embodying my improvements is organized with a special reference to registering fares on passenger cars or vehicles; and it belongs to the duplex type of machines—that is, to machines having more than one set of registering mechanism simultaneously operated in registering or recording the fares. In the present machine there are three sets of devices or groups of mechanism for registering or recording, all practically simultaneously operated by the same prime mover or actuator in operating or actuating the machine, and all of them register the consecutive fares, and at the same time for each actuation of the registers an alarm, which forms part of the machine, is sounded to notify those in the car or vehicle that a fare has been properly tallied.

The first of these registering mechanisms is a register for registering consecutively the fares as received on each trip or partial trip of the car or vehicle, it being what is commonly known as a "trip-register," and is capable of being reset or turned to zero at the end of each trip or partial trip of the car or vehicle to commence registering anew. The dials of this register are exposed to view, so that as the counting progresses the passengers and any detective of the road who may be in the car can see that the machine is being properly worked and note the changes which take place in the indications of the machine.

The second set of registering mechanism is a register for consecutively registering the fares as received on a large number of trips, or partial trips of the car or vehicle, and is what is known as a "general" or "permanent" register. It registers concurrently with the trip-register, but is incapable of the resetting movements of said trip-register, so that while the trip-register registers the fares for each trip only, the general register keeps a continuous count or tally of the fares for a large number of trips, and shows in the aggregate the fares registered or tallied since the machine was started at zero or the starting point.

The third registering mechanism of the machine is a recording arrangement, upon which a strip or band of paper or other suitable material is used, to be gradually fed forward and punched once for each fare received simultaneously and concurrently with the operation of the trip and general registers. This recording strip or band is so organized that it records separately the fares registered on each and every trip, whereby a permanent record of the fares received and recorded on each trip may be taken and preserved; and this is highly advantageous for many reasons, some of which are set forth in the patent to N. A. Ransom, granted September 26, 1882, No. 265,145, and others will hereinafter appear.

Inasmuch as at the beginning of each trip the trip register is started anew, it will be obvious that its indications of the fares for the preceding trip are lost or effaced by the setting to the zero or starting point, while it is equally obvious, inasmuch as the general register tallies the fares consecutively and continuously, that after several trips have been made there will be, as far as the trip and general registers are concerned, no separate tally or count of the fares for each trip preserved. By the use of the strip or band to be perforated, however, once for each fare taken, a permanent record of the fares for each trip is preserved, and it shows, of course, the number of fares for each trip, and prevents in this way any serious manipulation of the machine to the conductor's advantage whereby he may escape detection of his fraud.

In the present machine there is also embodied a direction-indicator, or what is now commonly known as an "up-and-down," to indicate upon the face of the machine the direction of travel of the car or vehicle and to show in which direction of travel of the car the fares being registered are taken.

My present invention may be said to constitute an improvement more especially upon the type of registers shown in United States Letters Patent No. 9,312, reissued July 20, 1880, No. 206,565, of July 30, 1878, and Nos. 226,626 and 265,145, dated, respectively, April 20, 1880, and September 26, 1882, all of which are owned by my assignee, The Railway Register Manufacturing Company, of Buffalo, New York.

Figure 2:
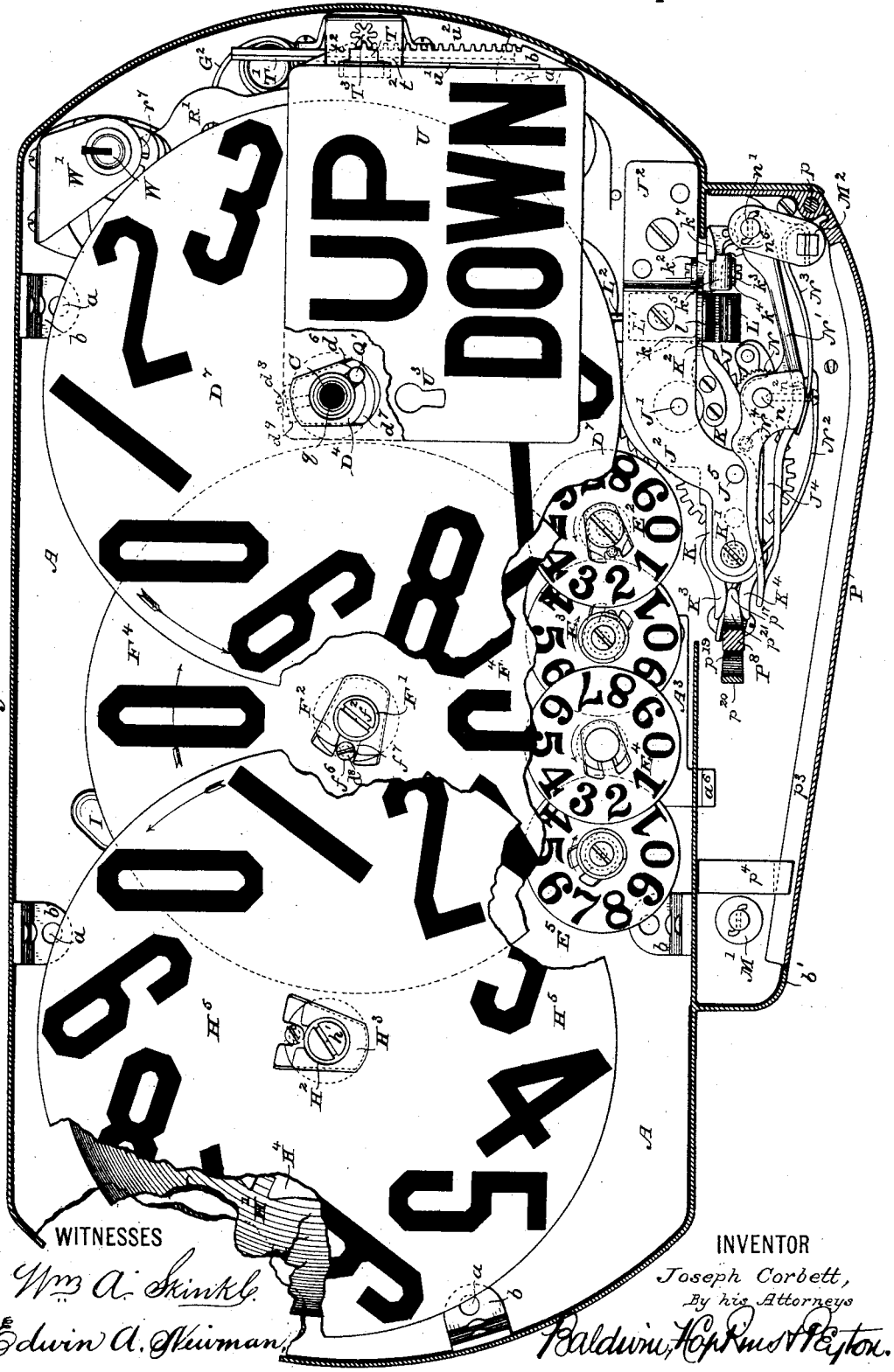
Figure 3:
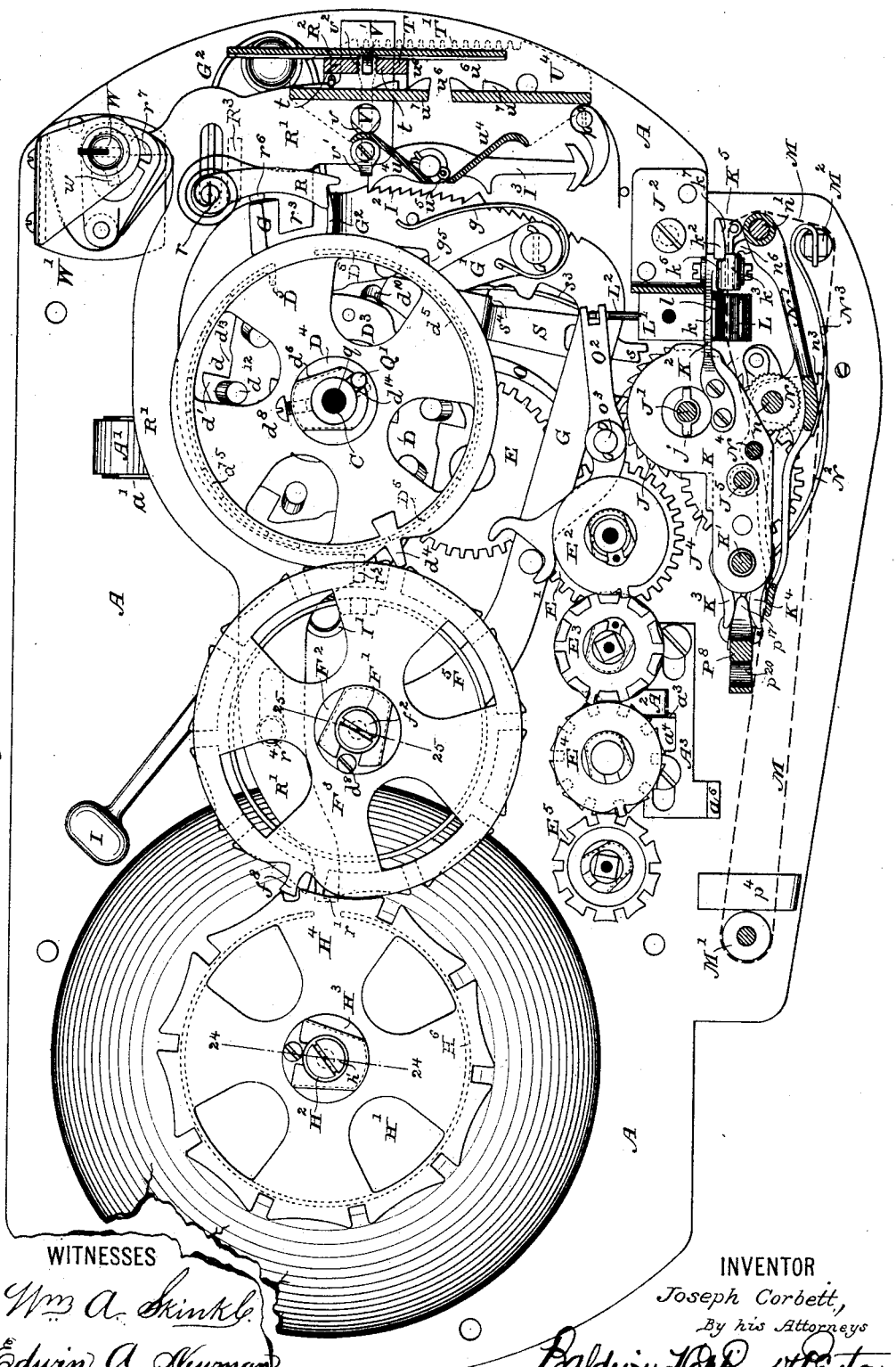
Figure 4:
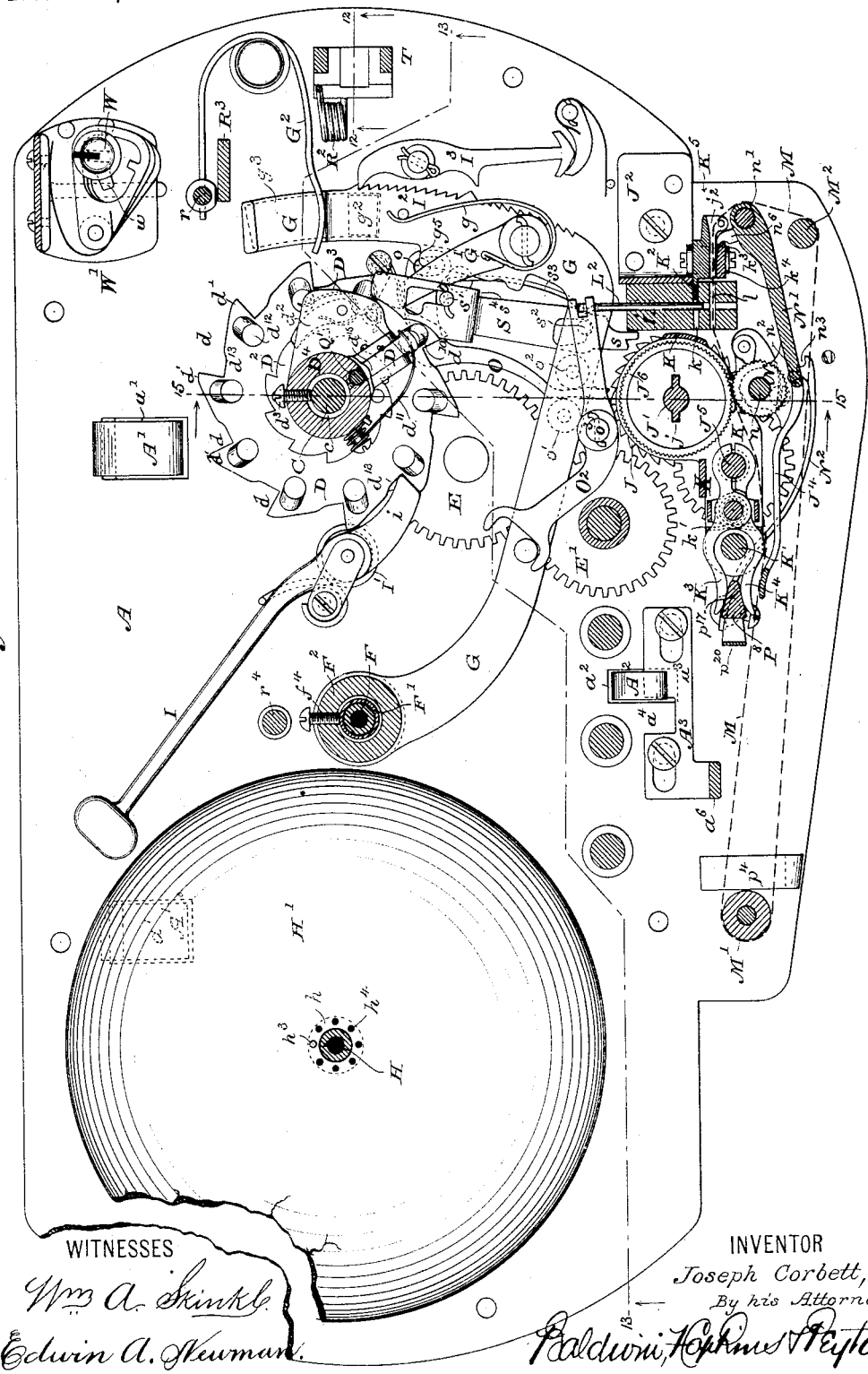
Figure 5:
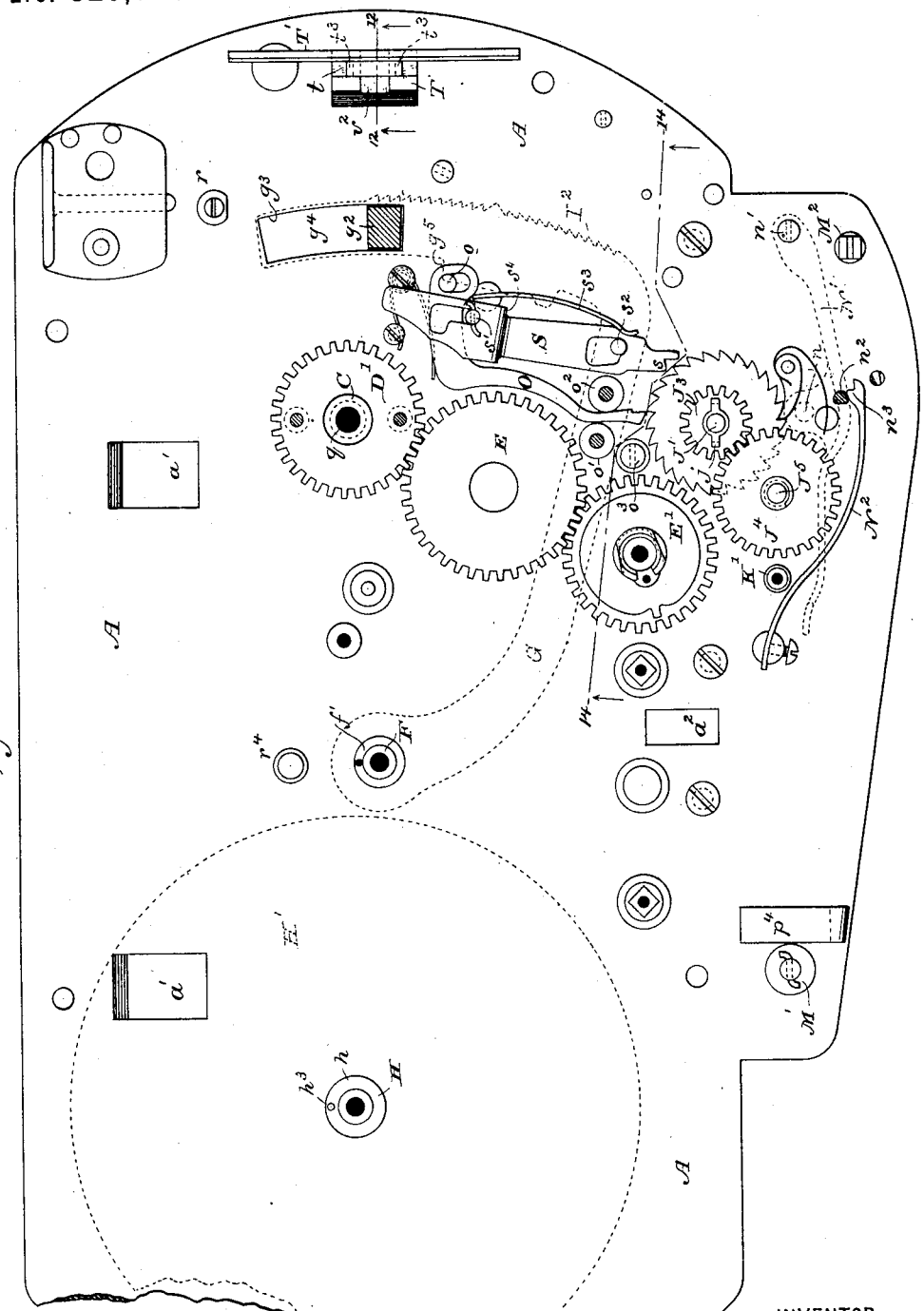
Figure 10:
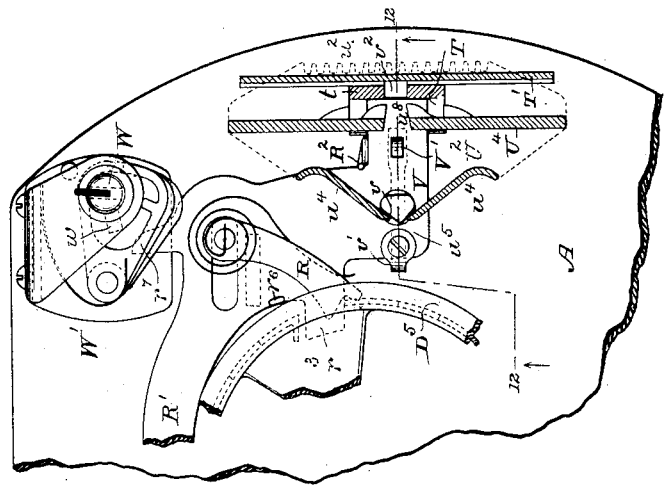
Figure 9:
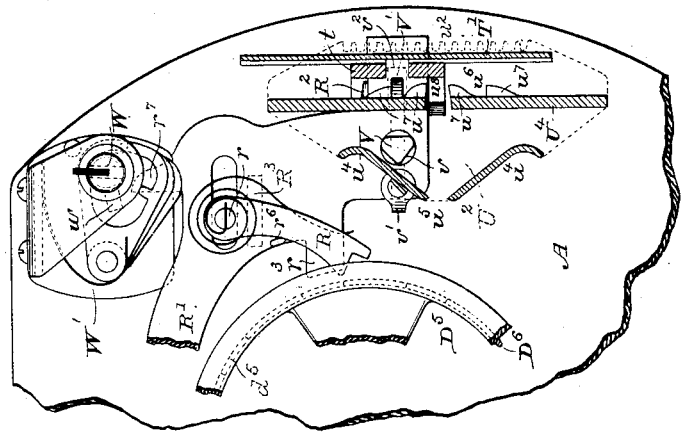
Figure 11:
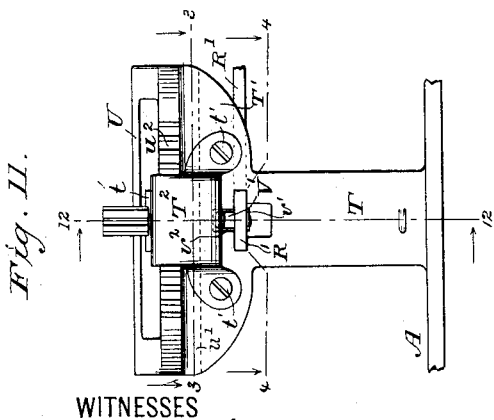
Figure 12:
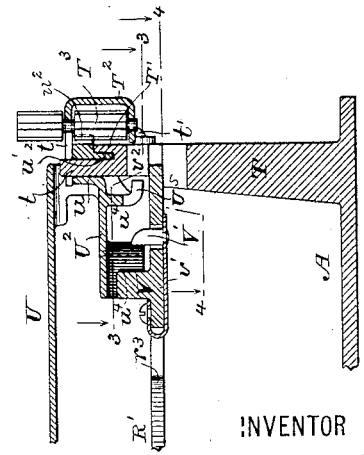
Figure 31:
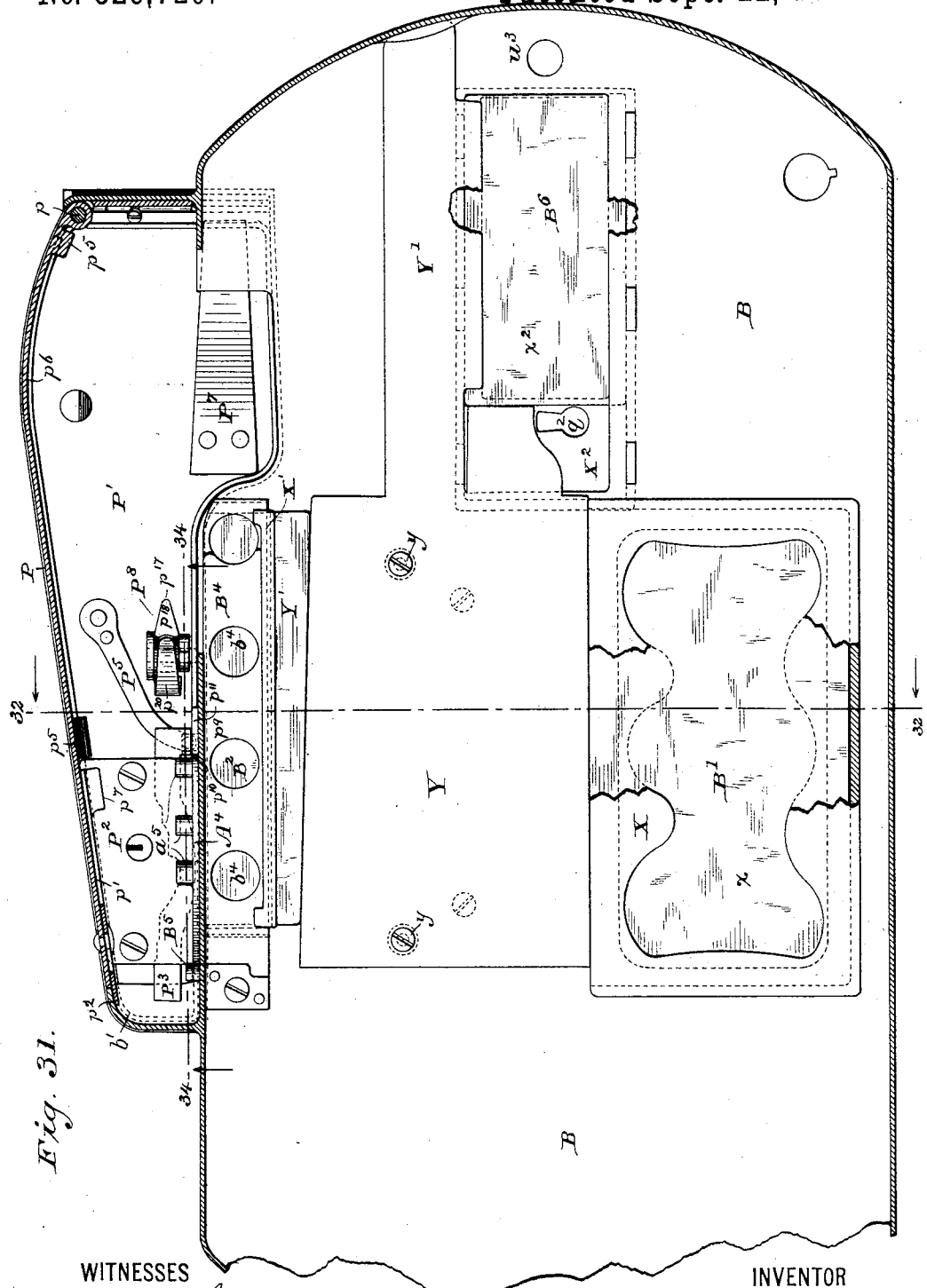

In the accompanying drawings, which show all my improvements as embodied in the best way now known to me for registering purposes, Figure 1 is a front view of my improved machine. Fig. 2 is a similar view with the face-plate of the machine removed and some of the parts broken away to expose other parts beneath. Figure 3 is a similar view, with the face-plate and the dials of the trip and permanent registers removed to show the parts beneath, and some of the parts being in section on the line 3 3 of Figs. 11, 12, 13, 19, and 20. Fig. 4 is a similar view, with still other parts removed to show those beneath and some in section on the line 4 4 of Figs. 11, 12, 13, 16, 17, 19, 20, 21, 22, 23, 24, and 32, to show them more clearly, and Fig. 5 is a similar view to show the parts next the base-plate of the machine. Fig. 6 is a view of a portion of the works of the machine, partly in section, showing more particularly the main actuating-lever of the machine as drawn forward, as in the act of finishing a count or tally, and after retracting the spacing-slide which separates the several counts or records of the recording band or strip. Figs. 7 and 8 are detached sectional views of a portion of the operating connections of the machine, showing more particularly the devices by which a space dividing the count or tally of two trips is made upon the recording strip or band by the resetting mechanism. Fig. 9 is a view showing a portion of the zero-stop mechanism, the pawl which prevents the trip-register from being reset except in a backward direction, the conductor's lock, by which he may secure his machine from operation while absent from the car, and a portion of the direction-indicator by which the movements of the zero-stop slide are controlled, the said parts of the indicator mechanism being in section, and Fig. 10 is a similar view, with the parts in a different position from that shown in Fig. 9. Fig. 10$^a$, Sheet 13, is a view of the zero-stop slide detached. Fig. 11 is an end view of the direction-indicator, looking from the right-hand end of the machine, and Fig. 12 is a sectional view therethrough on the line 12 12 of Figs. 4, 10, and 11. Fig. 13 is a bottom or edge view of the trip-registering portion of the machine, of the alarm, and of the direction-indicator, the section being taken through the casing on the line 13 13 of Fig. 4. Fig. 14 is a bottom edge view of the main actuating-lever on the line 14 14 of Fig. 5, showing more particularly the rollers on the back of said lever, between which one end of a pivot-lever, which actuates the recording devices, is mounted. Fig. 15 is a sectional view through a portion of the machine on the line 15 15 of Fig. 4, showing more particularly the lever and the spacing-slide for feeding the recording strip or band, the lug on the main actuating-lever, which projects through a slot in the back plate of the casing, being also shown as connected with an actuating strap or rod. by which the machine is operated from all parts of the car or vehicle where a fare may be taken. Fig. 16 is a sectional view through the main actuating ratchet or toothed wheel, and the set-back devices connected therewith, the section being taken on the line 16 16 of Fig. 6. Fig. 17 is a similar section therethrough, with the parts in a different position from that depicted in Fig. 16, the section being taken on the line 17 17 of Fig. 7. Fig. 18 is a view of a portion of the strip or band to be used with the recording devices, said band being shown as punched, and representing the count or tally for fares received on several trips of the car or vehicle, and Fig. 18ª, Sheet 13, is a perspective view of the endless recording strip or band, showing the preferred form thereof. Fig. 19 is a horizontal section through the casing of the machine at the point where it is provided with the perforating or punch-recording devices, the plane of section being taken on the line 19 19 of Fig. 1, and showing a bottom view of said recording devices, and also showing the bolt-and-lever arrangement by which the machine is locked in place in the car or vehicle, and also showing the locking devices of the cover or door of the machine, through which access is had to said recording devices, said door or cover being shown in dotted lines as swung open, and Figs. 19ª, Sheet 9, and 19ᵇ, Sheet 13, are views of the locking and sealing devices of said door or cover through which access is had to the machine, said last-mentioned figure showing more particularly the spring locking arrangement. Fig. 20 is a section through the recording devices, showing a bottom plan view of a portion of said devices, a hinged gate or frame which carries the secondary feed-roller of said devices being removed. Fig. 21 is an end view, looking from the right-hand side of the machine, of the punch arrangement of the recording devices of the machine. Fig. 22 is an end view of the backward and forward movable strip or band carrier, showing more particularly the details of construction of said carrier, looking from the right-hand end of the machine, a bottom view of said band-carrier being shown, also, in Fig. 20. Fig. 23 is a section through said band-carrier and a portion of its frame on the line 23 23 of Fig. 20, showing a view of said carrier from the end opposite that shown in Fig. 22. Fig. 24 is a section through the base-plate and post projecting forward therefrom on which the bell is mounted and around which it is adjustable, and on which the hundreds-wheel of the trip-register with its carrying devices is also mounted above the bell, the section being taken on the line 24 24 of Fig. 3. Fig. 25 is a section through the base-plate and post projecting forward therefrom on which the actuating-lever is pivoted and the tens-wheel of the trip-register and its carrying devices mounted, the section being taken on the line 25 25 of Fig. 3. Fig. 26 is a view of the setback key. Fig. 27 is a view of the key which operates the lock of the door covering the strip or band recording devices. Fig. 28 is a view of the key which operates the lock by which the conductor is enabled to lock his machine against actuation and then restore it to its first condition, said lock being located in this example at the upper right-hand corner of the machine. Fig. 29 is a view in elevation of a key for shifting the direction-indicator or "up-and-down" of the machine, and Fig. 30 is a bottom plan thereof, showing the toothed recess in the end of the key for engaging with a pinion that shifts said direction-indicator. Fig. 31 is a view of the inside of the face-plate and attached parts of the machine upside down, or turned over, showing more particularly the manner of securing the glass or transparent panes which cover the several inspection-openings in said face-plate, and showing, also, the obscuring slide or plate by which the figures on the general-register dials may be hid from inspection or be left exposed, and showing, also, the manner of hinging and locking the bottom plate of the casing enclosing the recording devices, as well as the door thereof opening at right angles to said hinged bottom plate, the rear face of the lock for securing these hinged portions of the casing being clearly shown. (In this figure the casing is upside down as it would be if removed from the machine and then turned over in an upward direction, or as if it swung back on a hinge.) Fig. 32 is a section through the casing on the line 32 32 of Figs. 1 and 31, showing more particularly the manner of fastening the glass in place in the casing, the obscuring slide of the general register, the way of locking the hinged bottom of said casing, and the lever for operating the slide which locks the machine in position in the car or vehicle. Fig. 33 is a section through the casing on the line 33 33 of Fig. 1, showing the plate for securing the glass panes which cover the inspection-openings in the casing in position. Fig. 34 is a section on the line 34 34 of Fig. 31, through a portion of the casing and hinged door thereof, showing the pivoted slotted bolt for locking the hinged bottom and the key-lock for locking the hinged door in place. Fig. 35 is a section through the glass window covering the direction-indicator or up-and-down, showing the glass as held in the seat in its frame at one edge by a fixed groove, and at the other by the bent edge of the glass-securing plate which is common to the several windows of the machine.

The casing of the machine is preferably oblong and of comparatively shallow depth, to accommodate the mechanism as organized in the present instance. This casing consists of a back or base plate, A, and of a front or face plate, B, the sides or ends and top and bottom of the casing being preferably formed integral with the face-plate, of stout sheet metal. Said plate B is securely fastened to the back plate, A, by means of lugs $b$, formed on the inner face of the sides of the face-plate B, which are provided with threaded perforations to receive screws $a$, passing through suitable holes in the back plate. This affords a ready and convenient way of constructing and of securing the parts of the casing together, and this casing constitutes an inclosing chamber or receptacle for the various operative parts of the mechanism of the machine, as will be hereinafter fully described. Of course the casing may be constructed in other ways.

Projecting forward from the back plate, A, is a fixed or rigid post, C, which constitutes the axis of the units-wheel of the trip or temporary register. Mounted upon this post, next the base-plate, and so as to turn around said post, is the main actuating-wheel D of the machine. Said main actuating-wheel D is provided at its periphery with, in this instance, ten notches, $d$, which form a like number of teeth, $d'$. Forming part of and rigidly attached to the rear surface of this main actuating-wheel D is a gear-wheel, D', concentric with said wheel D, while upon the front surface of said actuating-wheel D is likewise rigidly attached a ratchet-wheel, $D^2$, the teeth of which point in the same direction as those of the wheel D. Said gear-wheel D' meshes with a corresponding wheel, E, journaled upon the base-plate A, and this wheel E in turn meshes with a gear-wheel, E', which is the actuating-wheel of the general-register train of counting-wheels, as will be hereinafter more fully described. It will thus be seen that the two sets of registering devices, to wit, the trip-register and the general register, are actuated by the movement of the main actuating-wheel D of the machine. Said main actuating-wheel, as above stated, is provided on its front face with a concentric ratchet-wheel, $D^2$, and with the teeth of this last-mentioned wheel a pawl, $d^2$, pivoted upon the back of a projection or plate, $D^3$, is adapted to engage, so as to prevent the forward rotation of the turning sleeve $D^4$, which carries said projection or plate $D^3$, while permitting said sleeve $D^4$ to be turned backward independently of said main actuating-wheel D, as when the trip-register is to be reset. (See Figs. 4, 6, 7, and 8.) Said sleeve $D^4$ is mounted upon and so as to turn around the post C in front of the main actuating-wheel D and its ratchet-wheel $D^2$. Said sleeve $D^4$ is held in proper position upon the post C by means of a set-screw, $d^3$, passing through the sleeve and entering a circumferential groove, $c$, in said post. Said sleeve $D^4$ carries near its forward end a wheel, $D^5$, having a driving-tooth, $d^4$, in its periphery, and upon the rear face of said wheel $D^5$ is firmly fixed a circular band or annulus, $D^6$, perforated or slotted with ten equidistant notches, $d^5$, for a purpose to be presently explained. Upon the extreme front end of said sleeve $D^4$ the units-disk $D^7$ is mounted. This disk $D^7$ is of large size, and the method of mounting it upon the sleeve $D^4$ is peculiar. The end of the sleeve at opposite sides is cut away so as to have converging sides, but is not cut away to such a degree as to intersect the opening or bore of the sleeve, and these sloping cut-away sides are dovetailed or undercut at the edges, as at $d^6$. (See Figs. 2, 3, 16, and 17.) A central slot or opening, $d^7$, is formed in the disk $D^7$, corresponding in shape to but longer than the cut-away end of the sleeve $D^4$, and its side walls are preferably beveled, as shown in Fig. 2.

In applying the disk to the sleeve the disk is placed over the dovetailed locking end of the sleeve by means of the larger end of the slot $d^7$, and the disk is then moved lengthwise of its slot on said sleeve, so as to engage or interlock the beveled sides of the disk with the dovetailed or undercut edges of the sleeve, as clearly shown in Fig. 2, whereby it will be obvious that the disk cannot be withdrawn or moved off endwise from the sleeve unless the disk be moved so as to bring the dovetailed end of the sleeve within the larger part of the slot in the disk, and out of locking engagement with the walls thereof. When the disk has been applied to the sleeve and engaged with its dovetailed locking sides, I pass a set-screw, $d^8$, for instance, through a bent lip, $d^9$, of the disk into a screw-hole in the sleeve, as clearly shown in Figs. 2 and 3, so as to prevent movement of the disk upon the sleeve.

Any other locking device in place of the screw may be used.

This means of attaching a counting-wheel or disk to a sleeve or shaft is very advantageous, in that it permits the disk to be readily applied to the sleeve or shaft and readily removed when repairs are necessary to the machine, while when in its operative position upon the sleeve it is securely fastened thereto by a firm and positive driving-connection. Heretofore the disks have been detachably applied to their sleeves or shafts by means of screw-fastenings, &c.; but they are objectionable for several reasons, fully known to those skilled in the art of constructing and repairing registering-machines, and need not be mentioned here by me.

In order to form a driving-connection between the main actuating-wheel D and the sleeve $D^4$, which carries the units-disk $D^7$ of the trip-register, so that when said actuating-wheel is operated it will also positively operate said disk, I provide in this instance a lever, $D^8$, which is pivoted between ears or lugs of a recessed portion of the projection or plate $D^3$ on said sleeve, and has a rearwardly-projecting end, $d^{10}$. Said lever $D^8$ is acted upon by a spring, $d^{11}$, the tendency of which is to throw or keep the end $d^{10}$ of the lever in engagement with one of a series of ten depressions or recesses, $d^{12}$, formed in the front face of the main actuating-wheel at equal distances apart. (See Figs. 3, 4, 6, 7, 8, 16, and 17.) The said lever $D^8$ has the capacity of rocking backward and forward on the sleeve $D^4$ relatively to the main actuating-wheel D, but it is fixed as against lateral movement relatively to said sleeve $D^4$ which carries it, whereby, when said lever is engaged with one of the notches of the main actuating-wheel, the two are coupled together, so that the rotation of the main driving-wheel about its axis also rotates or drives the sleeve $D^4$, and consequently the trip-disk $D^7$, carried by it.

Further functions of the lever $D^8$ will hereinafter appear.

Mounted so as to turn freely upon a fixed or rigid post, F, and next the base-plate A of the machine, is the inner end of a main actuating-lever, G, by which the machine is operated in registering or tallying fares. This lever is preferably a curved or bent lever, to economize space and accommodate the parts of the machine as organized in this example of my improvements. The inner or hub end of said actuating-lever is mounted upon an enlargement of the post F. In front of said lever a sleeve, F', surrounds said post F, and is fixed thereon so as to be detachable, while rigid against turning movements when in place by means of a projecting pin or lug, $f$, which enters a pit or recess formed in the face of a shoulder or annular enlargement, $f'$, of said post. (See Figs. 5 and 25.) The sleeve F' is locked to the post F as against endwise movement by means of a headed screw, $f^2$, which is screwed into a threaded opening in the front end of the post, as clearly shown in Figs. 2, 3, and 25, the head of the screw $f^2$ fitting a countersink in the front end of said sleeve. This sleeve F' is readily detachable when the machine is to be taken apart, while, when in place, it constitutes an axis upon which a sleeve, $F^2$, is mounted, and turns without danger of being turned or moved by the movement of the main actuating-lever about the inner end of the post as an axis. The periphery of the sleeve F' at its lower end is enlarged and tapered, as at $f^3$, and forms a seat for the enlarged or tapered mouth of the rear end of the sleeve $F^2$, whereby it will be seen that while the sleeve $F^2$ is free to turn about the fixed sleeve F' as an axis when driven in the counting operation hereinafter described, still it is not interfered with by the movements of the main actuating-lever about its axis. The sleeve $F^2$ is secured upon the fixed sleeve F', so as to be kept in place thereon while free to turn or revolve by means of a screw, $f^4$, passing through said sleeve $F^2$ and engaging at its inner end with an annular groove, $f^5$, in said fixed sleeve. Said turning sleeve $F^2$ carries near its front end a driving-wheel, $F^3$, substantially similar to the driving-wheel $D^5$ of the units-disk, and at its extreme front end is provided with a detachable dovetailed or interlocking connection for the tens-disk $F^4$ of the trip-register, substantially like that before fully described in connection with the sleeve and units-disk of the trip-register. In this instance, however, there is no necessity, after the tens-disk has been applied to the locking end of the sleeve, of passing a screw through a bent lip of said disk laterally into the sleeve, as the headed screw $d^8$ may be passed into a screw-hole in the front end of the sleeve, so as to bear upon a flat lip, $f^6$, of the tens-disk, or so as to lie between such a lip and a shoulder or shoulders, $f^7$, of the cut-away end of the sleeve. (See Figs. 2 and 3.)

Mounted upon a fixed or rigid post, H, projecting from the base-plate of the machine, and supported with its concave surface toward said back plate, but not in contact therewith, is a bell, H', having a central opening through which a reduced portion of said post H extends. The edges of the bell around its central opening rest upon an annular shoulder, $h$, formed by reducing the front end of the post H, and the bell is held against said shoulder by means of a sleeve, $H^2$, passed on over the front end of the post and held thereon as against endwise movement by means of a headed screw, $h'$, screwed into a screw-threaded opening in the front end of the post. The head of the screw fits a countersink in the end of the sleeve $H^2$, as clearly shown in Fig. 24. Said sleeve $H^2$ is prevented from turning about the post H as an axis by means of a recess or pit, $h^2$, in its inner end, which receives a pin, $h^3$, projecting forward from the annular shoulder $h$ of said post. This pin $h^3$ also passes through one of the series of holes $h^4$, formed in the bell concentrically with its axis-post H. (See Figs. 4, 5, and 24.) By this means it will be seen that the bell can be shifted about its axis, while when adjusted it is rigidly locked as against either turning or endwise movement, and this is very advantageous, in that when the bell is worn or in any wise injured by repeated blows of the hammer on the same spot, or there exist defects in the bell upon or near its edge at any point, it can be readily shifted to present a new surface to receive the blows of the hammer.

In front of the bell H', and mounted upon the fixed sleeve $H^2$ so as to turn about it as an axis, is a sleeve, $H^3$, said sleeve at its rear end having a tapered mouth to fit a tapered enlargement, $h^5$, of said sleeve $H^2$, (see Fig. 24,) and said sleeve $H^3$ is locked upon the fixed sleeve, while free to revolve thereon, by means of a screw, $h^6$, passed through the sleeve with its inner end engaging a circumferential groove, $h^7$, in the said fixed sleeve. Said turning sleeve $H^3$ carries a notched driving-wheel, $H^4$, and on the extreme front end of said sleeve there is a sliding detachable interlocking connection between the sleeve and a hundreds-disk, $H^5$, of the trip-register, substantially similar to that before described. There is also an annulus or rim, $H^6$, connected to the rear face of said driving-wheel $H^4$, corresponding to the annuluses of the driving-wheels of the units and tens disks. In the present example the posts C, F, and H, on which the trip-register disks are mounted or about which they turn, are in a line across the machine, and said disks are provided upon their front faces with figures or numerals, one of which on each disk, as usual, is visible through a window or openings in the face-plate B.

In order to employ dials with large figures, the advantages of which are obvious, without enlarging the machine too much, and to bring the number on each disk which is to show through the front plate of the casing near the center of the machine, so as to enable the indications of the machine to be easily read and distinctly perceived from all parts of the car or vehicle, I have devised a way of organizing the trip-register disks and of lettering or numbering them, which I will now describe. The said units-disk $D^7$, tens-disk $F^4$, and hundreds-disk $H^5$, are each of comparatively large size. In my organization the central or tens disk, $F^4$, is overlapped by both the units-disk $D^7$ and hundreds-disk $H^5$, as clearly shown in Figs. 1, 2, and 13. This brings the disks close together, while still exposing a comparatively large space on the face of the tens-disk $F^4$ above the center of the machine, and between the edges of the units and hundreds disks on each side thereof. The numbers on the tens-disk are from 1 to 0, inclusive, and the figures are painted, printed, or otherwise placed on the face of the disk radially, as has heretofore been usual. Not so, however, with the units and hundreds dials. The figures or numerals on these dials, instead of being the usual radial figures, lie around the edge of the disks at an angle to the radius thereof, as clearly shown in Figs. 1 and 2—that is to say, the numbers do not lie in the same plane as radial lines. These numbers, like the numbers of the tens-disk, are from 1 to 0, inclusive.

By organizing the disks as described, it will be seen that when the numbers of the disks are brought opposite a window, B', in the face-plate of the casing, the exposed numbers will be vertical on all the disks and will be close together, so as to be distinctly seen and read with ease through a comparatively small window. (See Fig. 1.) Were the numbers on the units and hundreds dials in a plane with the radius, like those of the tens-disk, the numbers would not be vertical when opposite said window B', but would lie at an angle to the number of the central disk, and the indication would not be plain and easily read. The radial number on the tens-disk only would be in the right position relatively to the face-plate of the casing to be properly exposed. By doing away with this angular arrangement of the numbers on the units and hundreds dials, the vertical numbers would be widely separated, as has heretofore been the case, and a longer window or a separate window for each disk would have to be employed, and this with the disadvantage attendant upon a wide separation of the figures exposed to view. It will thus be seen that I employ larger disks and larger numbers thereon without materially enlarging the machine, and that at the same time the exposed figures indicating the count or tally are close together.

By the organization I have described I also am enabled to employ a very large bell, whereby a distinct alarm is given when the register is operated. The bell being mounted upon one of the posts around which one of the disks turns, permits this without interfering with the operation of the disk, as has heretofore been explained. The bell-hammer I is a pivoted hammer, as usual in this class of machines, and is thrown against the edge of the bell by a spring, I', placed under tension when the hammer is moved away from the bell, so that when the hammer-lever is released it is thrown with considerable force against the edge of the bell to sound an alarm. The bell-hammer lever is a double-armed lever, the short arm $i$ of which is shaped on its end somewhat like a pawl, and engages with the periphery of the main actuating-wheel D of the machine. When said actuating-wheel is rotated, the successive teeth $d'$ of said wheel act upon the short arm of the lever, and, rocking said lever on its pivot, carries the hammer end away from the bell. As the movement of the main actuating-wheel is about completed, the tooth which raised the hammer against the force of its spring passes beyond the end of the lever and allows it to spring down into the notch immediately following said tooth, and consequently also permits the hammer end of the lever to be thrown against the bell to sound the alarm. The notches $d$ of the main actuating-wheel D are peculiar—that is, they are not ordinary ratchet-notches, but the notches have an enlargement or supplemental notch, $d^{13}$, clearly shown in Figs. 3, 4, 6, 7, and 8, the purpose of which will presently be explained.

I have heretofore stated that the main actuating-wheel D of the machine is geared with a gear-wheel, E', of the general register train. This train of wheels $E^2$ $E^3$ $E^4$ $E^5$ is a well-known construction, operating preferably on the well-known Geneva stop principle. The first wheel is the units-wheel, and on each complete rotation thereof it turns the next or tens wheel one point, and at each complete rotation of said tens-wheel the hundreds-wheel is turned one point, and the next wheel is operated by the hundreds-wheel to register thousands in the same way. I have shown in this example the numbered disks of the general-register train as detachably mounted upon their carrying sleeves or shafts by means of my improved detachable interlocking connection, hereinbefore described. This general register, it will be obvious, is capable of registering a large number of fares, its capacity lacking one of ten thousand in this example; but its capacity may be increased or diminished as circumstances require. The driving gear-wheel E' of the general register is rotated step by step correspondently with the intermittent rotation of the main actuating-wheel D, and the trip and general registers register or tally concurrently and simultaneously, so that one register constitutes a check upon the other, and at the same time it will also be obvious that the alarm will be sounded once for each actuation of said registers. This consecutive intermittent actuation of the trip and general registers and simultaneous sounding of the alarm is accomplished in this example by a single driving or actuating pawl, G', carried by the main actuating-lever G of the machine. This pawl is pivoted to the front surface of the actuating-lever G in this example, and is acted upon by a spring, $g$, to keep it in contact with the periphery of the main actuating-wheel D. (See Figs. 3, 4, and 6.) Likewise a comparatively stiff spring, $G^2$, acts on the actuating-lever, so as to keep it in a normal position, as shown in Figs. 3 and 4, with the driving end of its driving-pawl G' in contact with the abrupt end of one of the teeth of the actuating-wheel D. The spring $G^2$ also returns the lever to its normal position when the actuating movement is completed.

On the rear surface of the actuating-lever G, near its upper end, is a lug or actuating projection, $g^2$, which extends through the back or base plate of the casing to constitute a means for rocking or vibrating the lever about its pivot to actuate the machine. This actuating-lug $g^2$ travels in a curved slot, $g^3$, in the base-plate of the casing, and on the back of said base-plate is fitted with a thin plate, $g^4$, Figs. 5, 14, and 15, to travel with it. This plate should be large enough to cover the slot in the back plate of the machine, and also stiff enough to constitute a guide and support for the lever at the outside of the machine, whereby the upper end of the lever is retained in place, while permitted to slide freely, and, as it is fitted nicely at its inner end to the post about which it turns, steady and true movement of the lever is insured in the operation of the machine and all loose movement avoided. No access can be had through the slot at the back of the casing to manipulate the instrument, as the plate $g^4$ prevents this. A bell-crank lever (not necessary to be shown, as it is a well-known instrumentality for the purpose) will be connected at one end to the actuating-lug $g^2$ and at the other to a strap or rod, $G^4$, extending through the car, so as to enable the register to be operated from any part of the car in which a fare may be taken, my improved register in this instance being what is known as a "stationary" register—that is, one designed to be securely fastened in place in the car or vehicle, at one end thereof, in full view of the passengers. Instead of an intermediate connection or bell-crank, the strap or rod may be connected directly with the actuating projection $g^2$ of the main actuating-lever, as shown in Fig. 15. When a fare is taken, the strap or rod is operated—that is, pulled or turned—and the main actuating-lever G caused to move upward on its pivot. This movement causes the driving-pawl G', by engagement with one of the teeth of the actuating-wheel D, to turn said wheel partially around, (one tooth, or the distance of one notch in this example,) and this movement of said wheel is imparted to the units-disk of the trip-register, and by the gear-connection to the general register, and these registers show that an additional fare has been registered. As before said, the bell is struck for each fare registered on the trip and general registers. As soon as the actuating force is removed, the lever G is returned to its normal position in readiness for a new actuation which is to increase the count or tally.

In order to compel a full movement of the actuating-lever G in both directions of its movement, so as to prevent the sounding of a false alarm—that is, the sounding of an alarm without registering—I apply to the curved edge of the actuating-lever my double-ratchet arrangement $I^2$, acted upon by a shifting-pawl, $I^3$. This arrangement is fully described in Letters Patent of the United States heretofore granted to me, Reissue No. 6,929, dated February 15, 1876, and need not therefore be particularly described in detail here.

In order to prevent the main actuating-wheel D, and consequently the units-wheels of the trip and general registers, from being carried more than the proper distance, or one point on the dials, by a sudden or excessive pull upon the actuating-lever G, I have provided said lever with a shoulder, extension, or projection, $g^5$, which, when the lever approaches the end of its actuating movement and reaches it, will engage or come in contact with the edge of the next tooth of said actuating-wheel, back of the tooth thereof, upon which the driving-pawl G' has just operated, and will thereby positively stop the movement of the actuating-wheel and prevent it from moving more than the proper or required distance to show a new number at the windows of the register. This action is seen at Fig. 6. This positive stop is effective not only to positively limit the movement of the main actuating-wheel while counting, but also to insure a distinct blow upon the bell, inasmuch as the main actuating-wheel cannot be carried so far as, when the hammer is tripped, to cause its short end $i$, which engages the wheel, to strike, say, half-way up the incline of the succeeding tooth. The short arm of the hammer-lever is caused to drop squarely down into the deepest part of the notch, for it is tripped just as the movement of the main actuating-wheel is positively stopped. When, however, there is wear of the shoulder $g^5$ of the actuating-lever, or of the teeth of the actuating-wheel, a defect may exist in the blow delivered from the cause above explained; but this I have provided for and avoided by making the notches $d$ in the main actuating-wheel D with the supplemental notch or extension $d^{13}$, before mentioned. It will be obvious that, even if wear occurs between the parts so as to permit loose or excessive movement, the short arm of the hammer-lever, when tripped, will still have a deep notch into which to drop, and the perfect sounding of the alarm will be given.

In operation an actuating movement given to the lever G causes the main actuating wheel to turn the distance of one tooth, and, as before explained, this movement is imparted to the units-wheels of the trip and general registers and the alarm is sounded. When the ninth actuation takes place, the driving-tooth $d^4$ on the driving-wheel $D^5$ of the units-disk enters a notch in the driving-wheel $F^3$ of the tens-disk and turns said disk one point on the tenth actuation, and when said tens-disk has made a complete revolution in the counting process its driving-tooth $f^8$ in the same manner has entered a notch in the driving-wheel $H^4$ of the hundreds-dial and turned it one point. These driving-wheels, it will be seen, are organized in a well-known way, and on the Geneva stop principle, so that they are positively locked until actuated by the driving-teeth of the wheels.

In addition to the trip and general registers there is a third counting or recording device, which is also simultaneously operated with the said trip and general registers to consecutively record the fares; and the construction and operation of this third or recording device I will now describe. The actuating ratchet-wheel J of this recording device is fixed upon a shaft, J', near the inner end thereof. This shaft is fitted to turn at its rear end in the back plate of the casing, and at its front end in a fixed supporting-frame, $J^2$, projecting forward from said back plate. Rigidly connected with said shaft J', in front of said actuating ratchet-wheel of the recording device, is a pinion-wheel, $J^3$, meshing with and driving a gear-wheel, $J^4$, which is fixed upon the inner end of a feed-screw, $J^5$. This feed-screw $J^5$ is fitted at its rear end to turn in the back plate, and at its front end to turn in the fixed frame $J^2$.

Surrounding the shaft J', so as to revolve therewith while free to move endwise thereon, is a main feed-roller, $J^6$. The connection between the feed-roller $J^6$ and the shaft J', by which the feed-roller is revolved while having the capacity to move endwise on said shaft, consists of longitudinal splines or ribs $j$ on the shaft fitting corresponding grooves in the feed-roller. Said main feed-roller $J^6$ is fitted within a frame, K, which is fitted to slide backward and forward on a guide-rod, K', at one end, and is also guided by a bar, $K^2$, in a guide-slot, $k$, in a portion of the fixed frame $J^2$ at the other end. The shaft J' also aids in guiding this sliding frame K, as will be obvious. Said sliding-frame K is perforated for the passage of the feed-screw $J^5$. Two jaws or levers, $K^3$ $K^4$, are pivoted to the rear or under side of the front plate of the sliding frame K. The outer ends of said jaws project beyond the sliding frame to the left, and have flaring or outwardly-bent ends, while the inner ends of said jaws are concavo-convex, so that when brought together they will surround the feed-screw $J^5$, as clearly shown in Figs. 4, 19, and 20. The inner or concave faces of these inner ends of the pivoted levers $K^3$ $K^4$ are screw-threaded, so that when the jaws are brought together upon the screw they will constitute virtually a nut, and when said screw is turned or rotated in its bearings the screw-threaded jaws will move endwise on the screw, inasmuch as the screw is fixed and will carry the sliding frame K with them. Springs $k'$ act upon said jaws or levers $K^3$ $K^4$, so as to hold the outer ends of the jaws together and the screw-threaded inner ends apart and out of mesh with the threads of the feed-screw.

I have stated that the bar $K^2$ forms one of the guides of the sliding frame K. This bar $K^2$ also travels with said frame in the guide-slot $k$ of the fixed frame $J^2$, before mentioned. At the right hand of said guide-slot $k$ in the frame $J^2$, in which said bar $K^2$ moves, said bar is connected with and carries a recording slip or band guide, and carrier, $K^5$. One of the jaws or members $k^2$ $k^3$ of this band-carrier—the jaw $k^3$, for instance—is a spring-jaw having a tendency to close with the other member when not positively separated therefrom. In this example said jaws or members $k^2$ $k^3$ are connected by a plate-spring, $k^4$, the tendency of which is to close said jaws, as above described. When closed, however, there is a space, $j^2$, between said jaws or members of the band-carrier $K^5$, in which the band or strip to be perforated, as hereinafter described, is carried, while free to be fed along endwise through said slot or recess. (See Figs. 4, 22, and 23.) The outer or front end of the lower jaw, $k^3$, has a beveled projection or head, $k^5$, forming an abrupt shoulder, $k^6$, which, when the jaws are in their closed position, extends across the band slot or space $j^2$ in the carrier or guide $K^5$, to close the outer end of said slot or space and securely retain the strip or band in said traveling guide. The outer or front end of a portion of the upper jaw, $k^2$, of the band-carrier is also provided with a beveled and shouldered head, $k^7$, which, when the jaws are closed, passes the side of the head $k^5$ of the jaw $k^3$, and also aids in closing the entrance to the band-slot in the guide or carrier $K^5$. This band slot or space in the traveling carrier or guide $K^5$ is directly in line with a punch slot, $l$, in a fixed portion of the frame $J^2$. This slotted portion L of the frame $J^2$ constitutes a punch head or die, and fitted in a portion, L', of said frame $J^2$ is a reciprocating punch-bar, $L^2$, the punch-bar moving endwise across the slot $l$ in the punch-head L of the fixed frame $J^2$ once for each actuation of the registering devices and alarm, to punch a hole in the strip or band, which is fitted edgewise in the punch-slot $l$ and in the slot of the sliding band guide or carrier $K^5$, as clearly shown in Figs. 3 and 4 by dotted lines.

The band or strip M, to be perforated by the punch L² once for each fare received simultaneously and consecutively with the operation of the trip and general registers and the alarm, is preferably a paper strip and in the form of a continuous band. (Shown by the dotted lines in Figs. 3 and 4, as aforesaid, and in Fig. 18ª.) This band is placed edgewise in the slots of the punch-head L and band carrier or guide K⁵ and between the lower edges of the front and rear plates of the sliding frame K, and at its top and bottom or broad surface is between the main feed-roller J⁶ and the second feed-roller, N, which is fitted upon a bar, n, so as to turn and move endwise thereon.

The placing of the strip or band M in position in the slotted frame and in its carrier and between the feed-rollers J⁶ and N is facilitated by the beveled ends of the punch-head and of the jaws of the band-carrier, as will be obvious. Said feed-roller N is carried by a hinged frame, N', which is capable of being moved or rocked up and down on its hinge or pivot n' to bring the two feed-rollers in contact, as when the machine is to be put into operation, or separate them slightly, as when the recording-band is to be put into the machine or removed. When said frame N' is in its closed position to bring the feed-rollers J⁶ and N together, and in feeding contact with the recording-band, as shown in Figs. 3 and 4, it is held or locked in that position by stiff springs N² N³, said spring N² acting upon a lug, n², on the inner edge of said frame, and when said frame is swung down a short distance, with its feed-roller away from the main feed-roller J⁶, said frame will also be locked in this open position by the action of a recess, n³, in said stiff spring N², which receives the lug n² on the inner end of the frame, above described. When said frame N' is open, and the two feed-rollers J⁶ N are separated, the jaws or members of the band guide or carrier K⁵ are also opened, and the recording band or strip may then be readily inserted in the carrier or guide and between the serrated or roughened surfaces of the feed-rollers, the edges of the upper half of the band lying between the front and back plates of the sliding frame K, as before described. The hinged frame N' is then closed and held or locked in that position by the springs above described. This action enables the jaws of the band guide or carrier K⁵ to close by their spring action, and the band will thus be securely fastened in the traveling or sliding frame K and between the feed-rollers J⁶ and N, the latter roller also rising so as to lie between the edges of the front and back plates of said sliding frame K, and be thus positively carried with said frame in its sliding movements, and directly below the main feed-roller J⁶. When said frame N' is opened, the movable jaw or member k³ of the band-carrier K⁵ is positively opened by the opening of said hinged frame N' by means of a hook, n⁶, on said frame engaging the upper side of said movable jaw k³. (See Figs. 2, 3, 4, 20, and 23.) The recording band or strip M is guided and held in the right position for the operation of the punch by being passed around guides M' M², projecting forward from the back plate of the machine, as clearly shown in Figs. 3, 4, and 19.

The operation of the punch-recording devices is as follows: At each operation of the main actuating-lever G, one end of a vibrating lever, O, is brought into engagement with one of the teeth of the ratchet-wheel J, and the movement is sufficient to turn said ratchet-wheel one point, or the distance of one tooth. Said lever O is loosely pivoted at its upper end at o to the base-plate of the machine, and the lower end is guided between two anti-friction rollers, o' o², journaled on the rear surface of the lever G. Said lever O is fitted to move slightly endwise when the main lever G is vibrated on its pivotal point or axis. When the force upon the lever G is removed, it is returned to its normal position by its spring, and the actuating end of the lever O is carried back sufficiently far to engage a new tooth of the ratchet-wheel J, when the main lever is again actuated. The organization of the lever O is such that at the beginning of the movement of the main actuating-lever the feeding movement or operation of the ratchet-wheel J takes place, and this, as will be obvious, feeds forward the endless band or strip M a short distance, equal, for instance, to the length of one of the teeth of said ratchet-wheel. As soon as this feeding movement of the band is accomplished, the further movement of the main actuating-lever G rocks a punch-operating lever, O², on its fulcrum-point o³, projecting from the base-plate, and forces the punch-bar L² across the punch-slot l and through the recording band or strip, whereby it will be obvious the band is perforated once in a new place and at a regular distance from the previous hole or perforation which has been punched for each operation of the register, and a count is therefore kept in this manner of the fares registered. The return movement of the main actuating-lever G of course withdraws the punch from across its punch-slot in which the band travels. Said punch-lever O² is a bent lever, connected at one end, preferably, by a loose connection, (an enlarged recessed end, for example,) with the actuating-lever G, the opposite end of the punch-lever being fitted to the punch-bar by a yielding connection to accommodate the straight or rectilinear movements of the punch in the punch-frame. This simultaneous operation of the trip and general registers and alarm with the recording devices continues as each fare is registered. It will be obvious that if no provision was made to avoid such a result when the band made a complete rotation, any subsequent punching thereof would be in the same line as the previous perforations, and the record would be mixed and unintelligible, or a new band would have to be applied for each trip or half-trip of the car or vehicle, as the case may be. To avoid this I employ a comparatively wide band or strip, and make use of the feed-screw and sliding-frame organization I have above described. By this organization it will be obvious that as the feeding of the band takes place, due to the actuation of the registering devices, the band will be gradually fed forward, and at the same time (in the present organization) toward the front part of the machine, the punching operations having been started with the sliding frame K next the base-plate A. This is due to the fact that as the actuating ratchet-wheel J is operated step by step to feed forward the band M to present a fresh space to be punched, the feed-screw $J^5$ is also being turned intermittently, and this, as before described, gives motion to the frame K, feeding it forward gradually to the front of the machine, and carrying the recording-band with it, as will be obvious. This feeding of the frame K by the feed-screw $J^5$ is so regulated that when the band has been fed all the way around the succeeding line of punch-holes will be made behind or below the line which has just preceded it, as clearly shown in Figs. 13 and $18^a$, whereby it will be obvious that a large number of fares may be recorded upon the band M and clearly and distinctly separated. The punch-holes, in other words, will be on a spiral line corresponding somewhat to the threads of the feed-screw. In practice the strip or band will have a capacity for a day's work, or even more, if desired. At the end of each day's work the band will be removed by the proper person and a fresh one inserted in its place for the succeeding day's work. Of course, when the fresh band or strip is placed in the machine, the sliding frame K will be moved down next the base-plate of the machine prior to commencing a new day's work. This can readily be accomplished by compressing the bent ends of the jaws $K^3 K^4$ to release the threaded ends thereof from the screw.

In order to compel the adjustment of the sliding frame K to its proper position next the base-plate of the machine for commencing a day's work, I provide the hinged frame $N'$, which carries the secondary feed-roller N, with a guide-rod, $N^4$, which, when said hinged frame is in its closed position, is adapted to pass into an opening in the front plate of said sliding frame K as said frame is fed forward by the screw $J^5$. At the end of a day's work, when a fresh band is to be put into the machine, the sliding frame must be moved back to its proper place to permit the rod $N^4$ to escape from the sliding frame K before the hinged frame $N'$ can be opened to permit the removal of the old or perforated band; hence the proper manipulation of this part of the machine is necessary, and accidental starting of the machine, with the sliding frame and band carried thereby in a wrong position, is avoided.

I have stated that the band or strip M is preferably a continuous band. In addition I prefer it to be divided off transversely by lines into subdivisions—say five points each—to facilitate the counting of the perforations or record made by the punching apparatus.

I have shown in Fig. $18^a$ a view of one of the continuous bands organized in the manner I prefer for practical operation. I prefer the band to be of such length that when perforated by a line of holes entirely encircling the band, the number of holes will be equal in each row. This enables me to subdivide the band transversely into divisions of, say, five, to facilitate computing the record made upon the band, as shown in Fig. $18^a$.

It will be obvious that ready access must be afforded to the recording devices of the machine in order to enable the proper person to remove and apply the recording strips or bands, while it is also necessary that unauthorized access to said recording devices should not be permitted. In this example the paper-strip recording devices are located at the bottom of the machine, near the right-hand corner thereof.

To afford access to the proper person I have provided the casing with a hinged bottom, P, and with a hinged door, $P'$, at the front of the casing. The bottom P is hinged at one end, at $p$, and is provided at its opposite end with a flat pivoted or rocking bolt, $p'$, (preferably slotted,) to fit at its locking end, $p^2$, above or behind a stout horizontal flange or lip, $b$, of the casing. This locks the bottom in place as against a downward or opening movement to cover the recording devices from below. Said bottom P is provided at its rear edge with an internal upwardly-projecting rib or flange, $p^3$, to fit inside the lower edge of the base-plate A, to insure a close fit and secure joint. To more securely lock the bottom to the plate, the rib $p^3$ fits near the free end of the bottom in a recess between a cleat or plate, $p^4$, and the back plate, said cleat being rigidly fastened to the base-plate, as shown in Figs. 2, 3, 4, 5, 19, and 32. The upper surface of the said bottom P, near its front edge, is provided with guides or lips $p^5 p^5$, to receive the inwardly-projecting horizontal rib $p^6$ on the inner face of the horizontally-swinging door $P'$. This locks the bottom at its front edge to the door $P'$ when said door is closed and interlocking with the lips $p^5 p^5$, and is an additional fastening to that of the bolt $p'$, rib $p^3$, and cleat or lug $p^4$. The outer upwardly-bent end, $p^7$, of said horizontal bolt $p'$, when the bolt is in its unlocked position, lies in the path of a portion of the horizontally-swinging door $P'$, (the lock thereon, hereinafter to be described, in this instance,) whereby when the said door is being closed said portion thereof comes against the outer or bent end of the bolt, rocks the bolt on its pivot $p^8$, and throws its opposite or inner locking end, $p^2$, behind or above the fixed flange or lip $b$ of the casing and securely locks the bottom and holds it in its locking position. (See Figs. 31, 32, and 34.)

Said hinged door P' is itself locked in its closed position by means of a lock, P², the spring-bolt P³, Fig. 19ᵇ, of which shoots behind a vertical flange or rigid portion, b', at the front side of the casing when in its locking position. This lock P² is preferably a spring-lock. The spring-bolt P³ is retracted by a flat key, P⁴, in this instance, Fig. 27, and, when retracted, is caught by a lug-ended spring, P⁵, one end of which is fastened to the inner face of the door P', and the lug $p^9$ of which spring rises or springs backward from the rear face of the door P', to snap into a recess, $p^{10}$, of said bolt or behind a shoulder thereof when retracted or in its unlocking position. (See Figs. 19, 31, and 32.) The bolt must of course be retracted before the door can be closed, and this is accomplished by a key, the bolt being engaged and held back by the spring P⁵, above described. When the door is closed, the bolt is released, so as to shoot behind the flange b' of the casing by means of a lug, $p^{11}$, on the lower front edge of the front plate of the casing B of the machine, which lug $p^{11}$, as the door is pressed to its place, forces the lug end of the spring P⁵ back against the inner face of the door P' and releases the bolt P³, which is immediately shot forward by its spring to enter behind the vertical flange b' of the casing B and lock the door, as above described. The door P' can now be opened, to permit access to the recording devices, only by means of a proper key to retract the bolt, and in order to prevent unauthorized access or expose such access should it be had, and also to expose tampering with the lock, I prefer to employ a seal, which must be broken before the key-hole in the face of the door P' can be exposed to receive a key or other device. To this end I provide a small auxiliary door, P⁶, to overlie the key-hole in the door P', said auxiliary door P⁶ being a hinged door and provided with a key-hole corresponding to and in line with that of the door P'. Between the front face of the said door P' and the rear face of said auxiliary door or cover P⁶, I insert a paper or other seal, so as to securely cover the key-hole in said door P', and which must be punctured or broken before the key can be inserted to unlock the lock P². The inner face of the auxiliary door P⁶ is provided with retaining-points $p^{12}$, so that, when a seal is inserted in place in the seal-lock and the auxiliary door or cover closed, they will pass through the paper or other seal and into pits or recesses $p^{13}$ in the face of the door P', (see Figs. 19 and 19ᵃ,) whereby the seal will be securely fastened in the lock in place over the key-hole in the door P', and cannot be removed by an unauthorized person without defacing it, nor be reinserted when so removed. The auxiliary door P⁶ or cover of the seal-lock is locked in position close down upon the seal by the same bolt P³ that locks the cover or door P' to the casing B. The said seal-cover P⁶ is provided on its inner face, near the end opposite to that which is hinged, with a hasp or perforated bolt-plate, $p^{14}$, which passes through a slot, $p^{15}$, in the door P', and receives a lug or hooked portion, $p^{16}$, of the bolt P³, when said bolt is shot forward by its spring, when released upon the closing of the door, by means of the lug $p^{11}$, before described. It will thus be seen that the seal-cover is locked in place by the same bolt that locks the door P' to the casing, and that to release the cover of the seal, the seal must first be broken and the action exposed in order to permit access to retract the bolt P³. Retracting said bolt P³ also releases the seal-cover to permit a fresh seal to be placed over the key-hole of the door P', as will be obvious from what has been said; and by again locking said door P', to close the machine, the seal-cover is also again locked to prevent said door P' from again being opened without destroying the seal. The rear face of the door P', near its hinge, is provided with a stiff plate-spring, P⁷, which bears upon a flat vertical surface behind said door. The action of this spring is to throw the door quickly open when the key is turned sufficiently to retract the locking-bolt P³, the spring being of course compressed or put under strain or tension upon the closing of the door, and also to throw the door open if not locked, so as to avoid accidentally leaving the door closed but unlocked.

Projecting inwardly from the rear face of the hinged door P' of the casing is a tongue, P⁸, hinged at its outer front end or base, so as to be capable of rocking or yielding relatively to said cover. The edge $p^{17}$ of this tongue P⁸ is tapered or beveled, while the end $p^{18}$ is also beveled, and in addition is cut away at an angle to said edge $p^{17}$ thereof. Upon the opposite edge $p^{19}$ of said tongue a spring, $p^{20}$, projecting from the rear face of the cover P', bears to press said tongue toward the right-hand end of the machine, as shown in Figs. 2, 3, 4, 19, 31, and 33. This tongue P⁸, upon the closing of the door P', enters by its beveled edge $p^{17}$ between the outer bent or flaring ends of the jaws K³ K⁴, the inner ends of which encompass the feed-screw J⁵ and act as a nut, as before fully explained. It is not until the door P' is closed that the said jaws K³ K⁴ are brought in driving connection with the said screw J⁵, and this is owing to the wedging action of the tapered or beveled edge $p^{17}$ of said tongue P⁸ upon the outer ends of said jaws K³ K⁴, which closes the inner screw-threaded ends of said jaws against the force of the springs acting on the jaws, while when said door is open the said tongue P⁸ is withdrawn and the springs of the jaws throw their outer ends together, separating their inner ends and releasing them from the feed-screw J⁵. It sometimes happens that the feed-screw J⁵ is left in such a position at the end of a day's work that on closing the door P' for the beginning of the next day's work the threads on the jaws K³ K⁴ will not mesh or fit exactly the threads of the screw; and hence, if the tongue P⁸ were rigid the door could not be closed, or if forcibly closed something would be broken. By pivoting the said tongue, however, and providing a spring to act upon it, the door may be closed at all times, while, if the screw is in such a position as to prevent the meshing therewith of the threads of the jaws $K^3 K^4$, the tongue yields in the outer ends of said jaws and is forced therein as soon as the screw is turned in the counting operation sufficiently for the concaved threaded ends of said jaws to properly engage therewith for driving contact. It will also be noticed that said tongue $P^8$, between the edge $p^{17}$ thereof and the rear face of the door $P'$, is recessed as at $p^{21}$, and this is for the purpose of releasing the jaws $K^3 K^4$ from actuating-contact with the feeding-screw $J^5$ by permitting them to escape from the wedging action of the tongue, should the frame K, upon which said jaws are pivoted, be fed too far forward. Were not some such safety arrangement provided, the continued operation of the machine, when the receipt of fares is excessively heavy and beyond the capacity of the recording band or strip, and the continued feeding forward of the frame K and the band carried by it would cause a rupture of some of the parts, as the said frame K would be fed by its screw-jaws $K^3 K^4$ against a rigid portion of the frame, and something would have to give way, and until the rupture occured the approach of the recording-band to the limits of its movement might not be noticed.

My improved register, as organized in this example, is what is called a "stationary register"—that is, it is designed to be fixed in some conspicuous part of the car or vehicle, at one end thereof generally, and be operated by the conductor by means of a strap, rod, or other connection, as before explained.

To afford a ready and secure means of fastening the register in place upon its usual baseboard, which it is not necessary to show, and to enable it to be readily taken down or removed by the proper person, I provide the back plate, A, of the casing with two holes $a' a'$, to permit the passage of upwardly-bent hooks $A'$ $A'$, Figs. 3 and 4, projecting from the front face of said base-board, and below said holes $a' a'$, I also provide the back plate, A, with a slot, $a^2$, to permit the passage of a hook, $A^2$, the hook or bent end of which extends downwardly or in a reverse direction to that of the previous hooks. The hooks $A' A'$ are the suspension-hooks, and bear the weight of the machine, wedging the back plate, A, of the casing close to the baseboard, by reason of the taper given to the hooked ends, while the hook $A^2$ is the locking-hook, by which the machine is locked rigidly in place. The hook $A^2$ projects through the slot $a^2$ in the back plate, and is engaged by a shoulder of a sliding bolt, $A^3$, fitted to the front face of said back plate, A, of the casing and having a cut-out portion at $a^4$. When the machine is hung upon the wedging-hooks $A'$ $A'$, with the hook $A^2$ entering the slot $a^2$ in the casing, the bolt $A^3$ is moved endwise to carry its locking edge $a^3$ under the downwardly-bent end of said hook $A^2$, and between said end and the slot in the casing through which it enters. Consequently, when the sliding bolt $A^3$ is, in its locking position, the machine is firmly locked in place, and cannot be removed except by obtaining access to the bolt $A^3$. This bolt $A^3$, is as has been said, upon the inner face of the back plate, A, of the machine, and consequently it cannot be operated unless access is had to the interior of the casing. In this example I operate said sliding bolt $A^3$ by means of a lever, $A^4$, pivoted horizontally to the fixed bottom plate proper of the machine, the inner end of which lever is provided with two lugs, $a^5 a^5$, which fit on opposite sides of a forwardly-projecting portion, $a^6$, of said sliding bolt. By rocking this lever $A^4$ on its pivot $a^7$, the sliding bolt $A^3$ is moved one way or the other—that is, either to engage the bolt with the locking-hook $A^2$ of the base-board, to which the machine is to be fastened, or to disengage it therefrom. The outer or front end of said lever $A^4$ is preferably bent in a downward direction, so as to afford a comparatively broad surface to be pressed upon by the rear surface of the lock $P^2$, for instance, of the door $P'$ when said door is nearly closed without having first moved the lever to a position to lock the register in place, whereby the door cannot be closed without first locking the register. (See Fig. 19.) The lever $A^4$ may be operated by hand directly to shift the bolt $A^3$. Thus it will be seen that the door $P'$ also affords access to the means for locking the register in its place in the car or vehicle, and that the door $P'$ cannot be closed without first locking the register in position.

In this example of my machine I have provided a slide to obscure or to expose, as may be required, the figures or numerals on the general-register train of counting-wheels. The indications of said register are observed through a window, $B^2$, near the bottom of the front of the machine. Interposed between a plate, $B^3$ having openings through which one number on each dial of the general register is read, and the face of said dials, and mounted in suitable guides back of said plate $B^3$, is a slide, $B^4$, which is provided with openings $b^4$, corresponding in number to those in the plate $B^3$. This slide $B^4$ may be moved endwise in its guides to carry its openings $b^4$ out of line with those in the stationary plate $B^3$, to wholly obscure the numbers on the general-register wheels from outside view, if desired; or it may be left with its holes coincident or in line with those in the stationary plate $B^3$, and thereby fully expose the indications of the general register as the count or tally progresses. The slide $B^4$ is operated to slide it either to obscure or expose the figures of the general-register dials by means of a slide-piece, $B^5$, projecting through a longitudinal slot in the bottom portion proper of the main casing B, so that the slide-piece $B^5$ extends or projects into the chamber, which is covered by the door $P'$.

Consequently, access through the door P' also affords access to the slide-piece B⁵, and without such access this obscuring-slide cannot be operated. It is sometimes desirable to leave the numbers of the general register exposed and at other times to obscure them. By the employment of the sliding plate B⁴ this is readily accomplished by the adjustment at any time of said plate by the proper person.

At the end of each trip or half trip, as the case may be, of the car or vehicle, the conductor, or collector of the fares, is required by the rules of the company or owners of the vehicle to reset or set back the trip-register to zero or the starting-point, so that during each trip, the trip-register shows conspicuously the fares being registered for that trip. In order to reset the trip-register independently, and without disturbing the count or tally of the general register, I make use of a key, Q, in this instance. (See Figs. 17 and 26.) The front end of the post C, around which the main actuating-wheel of the register turns, is recessed or bored out, as at $q$, to receive the reduced end $q'$ of said key, while the casing B, immediately over or in front of said front end of the post C, is provided with a key-hole, $q^2$, for the entrance of said key. Said key Q is also provided with a lateral bit, $q^3$, and this bit is in turn provided with a shoulder or projecting edge, $q^4$. When the key is inserted through the face-plate of the casing, with its shank $q'$ fitted in the opening $q$ in the post C, the bit $q^3$ bears upon the forward end of an endwise-movable rod, Q', the inner or rear end of which rod in turn bears upon the end $d^{15}$ of the spring-lever D⁸, which forms the driving-connection between the main actuating-wheel D and the sleeve D⁴, carrying the units-disk of the trip-register, as before described. Inward pressure upon the key causes said rod Q' to rock the lever D⁸ upon its pivotal connection, and disengages its end $d^{10}$ from the recess in the main actuating-wheel D; and inasmuch as at the same time the shoulder or edge $q^4$ of the bit of the key is by a slight turn passed into a recess, $d^{14}$, (Figs. 3 and 17,) on the front end of the sleeve D⁴, the key will be held in its place in said sleeve to raise the lever D⁸ against its spring, and will also have a positive connection with said sleeve D⁴, so as to turn it in resetting the trip-register. As will be obvious, the driving-connection between the main actuating-wheel D and the sleeve D⁴, carrying the trip-registering devices, is now broken, and the sleeve D⁴ and the units-disk and driving-wheel D⁵, carried thereby, can now be turned in a backward direction to reset said units-disk and the tens and hundreds disks by the driving-connections, before described, to zero, a movement by the resetting-key in the opposite, forward, or counting direction being prevented by means of a pawl, R, pivoted on the front end of a post, $r$, extending forward from the back plate of the casing A. Said pawl R engages by its abrupt locking end with a series of notches, $d^5$, one after another, in the wheel D⁶, before fully described. As long as the backward movement continues by the resetting-key, the pawl R offers no obstruction to the setting-movement.

As soon as the trip-register is brought to zero, or a point indicative of no count or tally thereon, it is locked by what is commonly known as a "zero-stop," and cannot be further turned by the resetting-key Q. During the first revolution of the sleeve D⁴ in resetting the trip-register to zero, the end $d^{10}$ of the lever D⁸ being raised by the setting-key, is brought against the upper end of a slide-bar, S, the lower end of which is provided with an actuating-point, $s$, and as said slide-bar is moved endwise under the action of the raised end $d^{10}$ of the lever D⁸ said actuating-point $s$ turns the actuating ratchet-wheel J of the recording devices and moves it one point, whereby at each resetting operation of the trip-register the line of perforations in the endless band or recording-strip will be broken, separated, or spaced, and said band will consequently show a distinct and independent record of the fares registered for each trip, it being understood that when the band is fed by the spacing-slide S there is no corresponding operation of the punch, as the punch is operated solely by the main actuating-lever G in counting or tallying the fares. The recording-band is also a zero-recorder—that is, it will show how many times the trip-register has been set to zero or the starting point, each blank space in the line of perforations in said band indicating a resetting operation. Consequently the band will be a permanent independent record, not only of the fares collected on each particular trip, but will also be a true index of the number of such trips; and if any fraud is attempted by manipulating or resetting the trip-register at improper or unauthorized times, this will also be exposed. The spacing-slide S is guided on the back plate of the register by means of guide-posts $s'$ $s^2$, which pass through enlarged or angular slots or openings formed in the slide, as clearly shown in Figs. 4, 5, 6, 7, and 8. A spring, $s^3$, acts upon the right-hand side of this spacing-slide S, near its lower end, and tends to force the actuating-point $s$ thereof into engagement with the teeth of the ratchet-wheel J at the proper time, when the slide is moved downward or forward by the lever D⁸, during the resetting operation of the trip-register; while, owing to the angular or enlarged opening or slot through which the post $s'$ passes, the slide at its upper end is also given a slight lateral movement to the right to carry it out of the way of the said lever D⁸ during its successive rotations in the same resetting operation. (See Fig. 8.) Consequently, after the spacing-slide has been once moved down to make a space in the recording strip or band, a subsequent or repeated revolution of the units-disk and sleeve D⁴ in resetting the trip-register to zero does not cause an additional space or spaces to appear on the recording strip or band. On the first actuation of the prime actuating-lever G, after the resetting operation of the register, the said lever acts against a shoulder, $s^4$, of said spacing-slide S, and carries it upward with it, and thus returns it to the position (see Figs. 3, 4, 5, 6, and 7) to be again forced downward or operated when the trip-register is again being reset. The guide-slot through which the post $s'$ passes is so shaped that when the spacing-slide S is being moved upward on the first movement of the main actuating-lever G said slide will be wedged or moved over into proper position for the lever $D^8$ to act upon it when raised by the resetting-key, as above described. The several positions assumed by the endwise and laterally movable spacing-slide S are shown in Figs. 3 to 8, inclusive.

I have said that when the zero-point is reached during the resetting operation of the trip-register by the key Q, said register is stopped at that point by a zero-stop. The zero-stop I have employed is peculiar. It is a progressive stop in this instance—that is, it first locks the hundreds-disk, then the tens-disk, and, lastly, the units-disk, of the trip-register—and in this, among other respects, it is highly useful and important. Said zero-stop in this example is a plate, R', and it has a reduced locking or stop end, $r'$, and two locking or stop lugs, $r^2$ $r^3$. The stop end $r'$ of said plate R' is adapted, when the hundreds-disk $H^5$ is at zero or 0, to enter a space cut in the annulus $H^6$ of the hundreds-wheel-carrying mechanism. The stop-lug $r^2$ is likewise adapted to engage a space cut in the annulus $F^5$ of the tens-disk-carrying mechanism when said hundreds and tens disks are at zero; and the lug $r^3$ is likewise adapted to enter a corresponding space cut through the annulus $D^6$ of the units-disk-carrying devices when said disk has reached the end of its resetting-movement, with the tens and hundreds disks at zero. A spring, $R^2$, bears upon the zero-stop plate R', which is a slide-plate, it being guided on suitable posts, $r^4 r$, projecting forward through slots in said plate, and being still further guided at its right-hand end by working in a vertical recess in a standard or post, T, projecting forward from the base-plate of the machine. Said spring $R^2$ exerts its force to throw or move the slide R' to the left and cause it to press either against the periphery of the annulus $H^6$, or against the periphery of the annulus $F^5$, or against the periphery of the annulus $D^6$, according to the positions of the hundreds, tens, and units disks of the trip-register; or, if the disks are at zero, to engage with the recesses in the several annuluses, as before described. During the counting operation the zero-stop slide R' is retracted, so as to permit the counting operation to progress freely. Suppose, now, that a trip has been made, one hundred and twelve fares registered, and a resetting operation is to be made. The zero-stop is now released and thrown forward by its spring. Its end $r'$ cannot at once enter the stop-slot in the annulus $H^6$ of the hundreds-disk-carrying mechanism, because in the operation of the register that slot has been carried out of line with the line of movement of the slide R'; hence the spring $R^2$ merely throws the end $r'$ of the slide against the periphery of said annulus $H^6$. The key Q is now inserted to disconnect the trip-register from the main actuating-wheel, and is turned to reset said trip-register. By the driving-connections, before described, the several disks are turned, as may be necessary, to bring the recess in the annulus $H^6$ opposite the end $r'$ of the slide, and as soon as this takes place, the said end $r'$ is immediately projected into said recess to lock the hundreds-disk, with its zero-point opposite the window B' of the casing. This movement of the slide is only a partial one, but as soon as a space in the annulus $F^5$ of the tens-disk is brought opposite the lug $r^2$, which is at the time said disk has its zero-mark opposite the window B', the slide is still further thrust forward, so as to engage said lug $r^2$ with said recess in the annulus of the tens disk, and thereby lock said disk from turning. A continuation of the resetting-movement by the key Q finally brings the recess in the wheel $D^6$ opposite the lug $r^3$; and inasmuch as the slide is already engaged with the recesses in the hundreds and tens disks-carrying devices, the slide is now immediately thrown forward or projected its entire distance of travel, carrying said lug $r^3$ into the recess of the annulus $D^6$, and locking the units-disk, with its zero-point opposite the window B'. Consequently the trip-register now stands at zero and is locked from further rotation. At the commencement of the resetting-movement, the zero-stop slide R' is held out of locking-contact with all three of the trip-disks-carrying devices, (if more than one hundred fares have been registered,) by reason of the end $r'$ of said slide bearing on the periphery of the annulus $H^6$. When the recess in said annulus is reached, the slide can only move a short distance into said recess, for the reason that the lug $r^2$ of the slide is now bearing upon the annulus $F^5$ of the tens-disk, and when the space in that annulus is reached the slide is projected still further, but not all the way, because the lug $r^3$ is now pressing against the periphery of the annulus $D^6$ of the units-disk-carrying devices, and it is not until the space in said annulus $D^6$ is brought opposite the lug $r^3$ in the final rotation of the units-disk in the resetting operation that the slide is projected forward all the way, so as to positively lock all three of the trip-disks at zero. As soon as the trip-register has been reset to zero, the resetting-key Q is withdrawn, and then the zero-stop slide R' is again retracted to release the trip-register wheels and permit the registration on a new trip to be made as the fares are collected. In order to control (or, in other words, retract and release) this zero-stop slide, and also in order to control the resetting operations so as to expose any fraudulent manipulation or attempts thereat, I employ in my improved machine what is commonly known as an "up-and-down" that is, a direction-indicator, which shows conspicuously through a window, $B^6$, in the face-plate of the casing the direction of travel of the car or vehicle, and consequently in which direction of travel of the car or vehicle the fares for the trip are being taken. This up-and-down, or direction-indicator, consists, preferably, of a flat plate, U, lying parallel with the face-plate B of the casing and behind the window $B^6$ thereof, as above mentioned. The face of the indicator is painted or otherwise provided with the words, in this instance, "Up" and "Down," to indicate the direction of travel, (such words being appropriate for indicating the direction of travel on most roads,) said words being so located on the face of the indicator as to permit only one of them being fully exposed through the window B at a time. This direction-indicator U is a vertically-sliding one, being fitted by vertical guides $u$ $u'$, Fig. 12, to receive the front end, $t$, of the standard or post T, said post being provided near said front end with a vertical guide-strip, T', between which and the right-hand side of the end $t$ of the standard T the guide $u'$ is nicely fitted and adapted to slide, the guide $u$ bearing upon the opposite side of said end $t$ of the post T, whereby a steady reciprocation of the indicator is insured. On the right-hand side of the vertical guide $u'$, near its front edge, is formed a series of rack-teeth, $u^2$. Mounted in a frame, $T^2$, detachably connected with the standard or post T, is a horizontal pinion, $T^3$, the teeth of which mesh with those of the rack $u^2$ on the direction-indicator U. A detachable key, preferably, or a thumb-piece, U', Figs. 29 and 30, having a toothed socket, is passed through an opening, $u^3$, in the face-plate of the casing, and engages with the front end of said pinion $T^3$, or an extension thereof, so as to turn it, and thereby shift the sliding indicator up and down, or vertically relatively to the window $B^6$.

Any suitable means for shifting the indicator may be employed, instead of the rack and pinion above described. In the present example the frame $T^2$, in which the pinion is mounted, is, as before described, detachably connected with the post T by screws $t'$, for example. Said frame, in addition, is forked or provided at its front end with two arms, $t^2$ $t^2$, which, when the pinion-frame is fitted to the post T, overlap the front edge of the guide $u'$ of the indicator U and enter interlocking-grooves $t^3$, Figs. 5 and 13, formed in the top and bottom edges of the horizontal post T, near its extreme front end, whereby the sliding direction-indicator plate is securely locked in position upon the guide-post T, while free to slide thereon when it is necessary to shift it in manipulating the machine.

On the rear side of the indicator-plate U, and firmly connected therewith or forming a continuation of the guide $u$ thereof, is a cam or double inclined arrangement by which the movement of the direction-indicator or "up-and-down" controls the zero-stop slide R'. This cam arrangement consists of a plate, $U^2$, having rearwardly-projecting inclined wedging or cam flanges $u^4$ $u^4$, converging nearly, but preferably not quite, to a point at $u^5$, whereby a space is left between the inclined cam or wedging flanges to form a seat for the front edge of a rigid wedge-projection, V, on the face of the zero-stop slide R'. The wedge sides $v$ $v$ of said wedging projection V are adapted to be acted upon by the inclined or cam sides of the rearwardly-projecting flanges $u^4$ $u^4$ of the direction-indicator plate U, whereby as said direction-indicator is shifted or moved vertically the zero-stop slide will be retracted by the cam or wedging action of said flanges or be released to be thrown forward. As before fully described, a stiff spring acts upon the zero-stop slide to project it forward or to its locking position relatively to the trip-disks.

The operation of the direction-indicator and the zero stop slide is as follows: Suppose the parts to be in the position shown in Figs. 1, 2, and 3, in which case the word "Up" on the face of the direction-indicator will be opposite the window $B^6$ of the casing. (As before stated, the face of the indicator is painted or otherwise marked with the direction of travel, as usual. In this instance the indicator bears the words "Up" and "Down," one above the other, and only one of which is adapted to be exposed opposite the window at the same time.) The direction of travel of the car is therefore indicated as "up," and those in the car know that the fares being registered are those collected on the up half of the trip of the car or vehicle. With the indicator in this position the zero-stop slide is retracted, and is held in such position by the projection V, which rides upon a flat or locking surface of the upper cam-flange, $u^4$, of the indicator. (See Fig. 3.) The operation of the register can therefore proceed without obstruction. When the up or first half of the trip is finished, the conductor must shift the indicator so as to show "Down" for the next portion or return half of the trip, and must also reset his trip-register to zero, owing to the rules of the company, as before explained. The pinion $T^3$, by its key U', is now, therefore, turned to shift or move the indicator vertically upward, but only a half-movement is permitted, as will be presently explained. The half-movement brings a key-hole, $U^3$, in the direction of indicator-plate U, in coincidence or line with the key-hole in the face-plate B of the casing and with the key-recess in the units-disk and its carrying devices. Until these several key-holes are coincident, or in line, the resetting-key Q cannot be inserted to reset the register. Therefore the shifting of the indicator at first is but for half the distance of its travel. This half-movement of the direction-indicator permits the retracted slide R' to move forward or to the locking position relatively to the trip-disks by the force of its spring, because in shifting the indicator upward the projection V has been released from the locking-surface and is permitted to move forward. The direction-indicator is permitted to have only a half-movement at first, in order to bring the key-holes in line or coincidence, as explained, and is also so limited in its movement to prevent the conductor from shifting the indicator without resetting the trip-register. This limitation of movement of the indicator is due to the action of a spring-tooth, V', projecting from the rear side of the zero-stop slide or plate R' through a slot or opening therein, so as to extend or project beyond its front face. As the movement of the indicator is commenced, the wedge projection V moves down the incline $u^4$ a portion of its length until the spring-tooth V' engages a toothed flange, $U^4 U^5$, of said indicator, which prevents the further forward movement of the zero-stop slide until said spring-tooth comes, as the movement of the indicator is continued, opposite an opening, $u^8$, in said flange $U^4 U^5$, when said tooth V' will enter said opening and the zero-stop slide will move forward sufficiently far to enable it to act upon the trip-register wheels. The indicator-plate cannot now be moved either forward or backward, as the spring-tooth V' thereof is in the opening $u^8$ of the flange $U^4 U^5$. Consequently the trip-register has to be reset to enable the zero-stop plate to be projected still farther forward by entering the notches in the several trip carrying wheels, in order to lock said trip register at zero, and when the trip-register is reset and said zero-stop plate has been thrown forward by its spring to its farthest extent the spring-tooth V' will have been carried beyond the flange $U^4 U^5$, whereupon the completion of the shifting movement of the indicator is permitted, which continuation of the shifting movement retracts the zero-stop plate or slide and locks it in its retracted position by the pressure of the wedge projection V upon a plain or flat surface of the lower flange, $u^4$, as before described, at which time the indicator will show the new sign "Down" at the window of the casing, while the register will be in condition to commence registering anew for the down or new trip or half-trip of the car or vehicle. When the stop-slide R' is released, so as to enable it to act upon the trip-register, the pawl R is permitted to engage the notches $d^5$ of the annulus $D^6$.

I have neglected before to state that when the zero-stop slide R' is retracted, the pawl R is also withdrawn from engagement with the notches $d^5$ in the wheel $D^6$, and this by means of a lug, $r^6$, on the face of the slide which comes against the edge of the pawl. (See Figs. 3, 9, and 10.) Were this pawl R not retracted it would offer an obstruction to the counting operation of the machine, as will be obvious. When the zero-stop slide is thrown forward or released, the pawl is also released to permit its spring to engage with the notches in the wheel $D^6$. The resetting-key is now (a half-movement of the indicator having been effected) inserted and turned to reset the trip-register, but can only be turned in the backward or proper direction to reset the trip disks, as before explained. As soon as the spaces in the several disk-carrying devices come opposite the locking ends or lugs of the zero-stop slide, said slide is projected into them successively, as before explained, the lug $r^3$ engaging with the annulus $D^6$ of the units-carrying devices at the last movement of the trip-disk to lock the wheel or disk at zero. Half of both the words "Up" and "Down" of the indicator are now opposite the window, and it now is necessary to complete the shifting of the direction-indicator, because otherwise the improper condition of the machine would be instantly exposed, while the machine cannot be worked. It is therefore necessary to move or shift it the remaining half of its travel. This brings the word "Down" fully opposite the window, and shows clearly that the shifting of the indicator has been completed. This last half of the movement of the indicator again retracts the zero-stop slide R' by the wedging action of the lower one of the inclines or flanges $u^4$ on the rigid projection V of the slide, and locks it in its retracted position by carrying the inclined flange above or past the projection V, which now bears upon, for instance, a straight or other equivalent locking surface, as before explained. The indicator is now shifted for the next trip, the trip-register has been reset, and the zero-stop slide is retracted to offer no obstruction to the registering operation. The registering operation for the down or return half of the trip now takes place, and at the end of that trip the indicator is again shifted to show "Up," and the trip-register is reset, the operation being the same as that before described. Thus it will be seen that the indicator must be partially shifted before the trip-register can be reset, and that when reset the shifting movement of said indicator must be completed, or a failure to do so will be exposed, while the register will be locked against operation by the zero-stop slide and by the pawl R. The trip-register cannot be reset without shifting the indicator, because the resetting-key Q cannot be engaged with the trip-register until the indicator has been shifted half its distance, and, as stated, when that is done, failure to shift the indicator all the way is instantly exposed and the machine rendered inoperative, and thus no fraud in this direction is permitted. Of course it will be understood that the distance I have described—to wit., a half-movement of the indicator—may be varied; but in the present organization that is preferred. During the resetting of the trip-register the prime actuating-lever G of the machine is locked from movement, and this is effected by means of a rearwardly-projecting plate or bolt, $R^3$, carried by the zero-stop slide R'. When said slide is projected forward to act as a zero-stop, its bolt $R^3$ is carried above or behind the upper end of said main actuating-lever G, and offers a rigid bar or stop to its vibration or actuation. When the slide is fully retracted, however, this bolt $R^3$ is carried out of the path of movement of the lever G, and it can consequently be operated to actuate the register, as before described. This bolt $R^3$ not only locks the main actuating-lever G when the trip-register is free to be reset to zero by the set-back mechanism, but is in addition an instrumentality by which the conductor can lock the machine if he should be called away from his car, so as to prevent malicious or mischievous actuation of the machine during the conductor's absence. I have so organized the zero-stop slide carrying said bolt $R^3$ with the direction-indicator and a lock, of which the conductor holds the key for his own protection, that such malicious or mischievous operation of the machine may be prevented. It requires but a slight forward movement of the slide R' to carry its bolt $R^3$ above the upper end of the actuating-lever G so as to lock it. Said slide R', near its right-hand end, is provided with an inclined spring-tooth, V', as before described, which projects through an opening in the slide, said tooth at its inner end being mounted upon a plate-spring, $v'$, so that said tooth is capable of yielding in a backward direction relatively to the face of said slide. When the slide R' is fully retracted, the spring-tooth V' enters a recess, $v^2$, intersecting the vertical slot in the post T, in which the right-hand end of said slide enters when said slide is retracted, as before described. In this position the spring-tooth is to the right of the rearwardly-projecting flange $U^4$ of the direction-indicator plate U. This flange $U^4$ is bent almost at a right angle, so as to form the supplemental flange $U^5$, projecting to the right and provided with notches $u^6$, which form teeth $u^7$ on each side of the central opening, $u^8$, before described, corresponding to the opening at the point $u^5$ of the plate $U^2$. When the slide is retracted, this spring-tooth V' yields, so as to pass by or behind and to the right of the flanges $U^4$ $U^5$. Suppose the indicator to be in the position to show the up half of the trip, as in Figs. 2 and 3, and suppose, further, that during said up half of the trip, at an intermediate point, the conductor has to leave his car in case of accident or for any other reason, to insure the safety of his register and prevent any actuation thereof he has only to shift his indicator by the shifting key or knob a sufficient distance to release the projection V of the zero stop slide from the locking-surface of the flange $u^4$, before mentioned, and permit the slide to move forward under the impulse of its spring until the abrupt side of the spring-tooth V' bears against the edge of the flange $U^5$ and enters the upper notch, $u^6$, of said flange. This will lock the slide against further forward movement, and at the same time the bolt $R^3$ will be carried above or behind the end of the main actuating-lever to securely lock said lever from movement. Were the actuating-pinion $T^3$ the only means of retracting or operating the zero-stop slide, it is obvious the indicator could not be moved back again to its former position, but that a complete shifting movement would have to be made to properly show the indicator before the window $B^6$. This would be necessarily so, because the spring-tooth V' having entered the notch $u^6$ a complete forward movement of the indicator would have to be made, because the tooth would offer a positive stop to a downward movement of the indicator by reason of the abrupt shoulder of the upper tooth, $u^7$. (See Fig. 9.) To enable the conductor, however, to bring his machine into the same condition as it was before he left the car, I have provided the zero-stop slide with a lug or projection, $r^7$, adapted to be acted upon by a lug, $w$, of the turning cylinder W, of a Yale or flat key-lock, W', located in this example at the upper right-hand corner of the machine. The slight or, in this instance, quarter movement which is given to the zero stop to lock the prime actuator, is not sufficient to bring the key-holes in the face-plate and indicator in line so as to permit a resetting operation, nor is the movement sufficient to carry the lug $r^7$ of said zero-stop slide beyond the reach of the lug $w$ of the cylinder W of the key-lock W', (see Fig. 9,) but it is sufficient to carry the bolt $R^3$ above or behind the upper end of the main actuating-lever to lock said lever from an actuating movement. All that is necessary, therefore, for the conductor to do when he returns to his post is to insert his key (see Fig. 28) in the cylinder W of the conductor's lock W' and turn it, so as to bring the projection or lug $w$ against the lug $r^7$ to retract the zero-stop slide R', which releases the spring-tooth from the notch $u^6$ in the flange $U^5$ and permits the direction-indicator now to be moved down or back to its proper place, (Fig. 3,) with the locking-surface at the end of the flange $u^4$ in engagement with the rigid projection V of the slide, whereby said slide is again locked in its retracted position, the indicator is in its proper position to indicate the up trip as before, and the main actuator is released, so that the counting operation for the up trip can be proceeded with. The same result will obviously follow a locking movement of the actuator by the conductor when the down trip is being proceeded with and he has for any reason to leave his car.

I have described the conductor's lock to be a cylinder or flat-key lock, which has, of course, the usual tumblers and other parts shown in the drawings, but not necessary to be described; but it will be understood that other types of locks may be employed in this connection with good advantage, whereby the conductor may lock his machine, and afterward restore the up-and-down and the zero-stop slide to their proper positions.

As has been fully described, there is a window, B', for the conspicuous display of the tally or count of the trip-register. There is a window, $B^2$, through which the indications of the general register may be read, and there is a window, $B^6$, through which the indications of the up-and-down or direction-indicator are plainly exposed. These windows are covered with glass, in order, without obscuring the indications of the several registering devices and the up-and-down, to prevent tampering with the mechanism or the entrance of dirt or other extraneous matter through said windows. Inasmuch as these glass panes are sometimes broken, it is desirable to provide a ready means not only of inserting and securely retaining in place the original panes, but also of replacing any that may be broken. To this end I provide skeleton recessed frames or casings $X' X^2 X^3$, open at one edge for the passage into the frames of the respective panes of glass $x\ x'\ x^2$, covering the windows of the trip and general registers and direction-indicator. These frames or casings are open at one edge, as stated, so that the glass may be inserted in said frames edgewise, as clearly shown in Figs. 31, 32, 33, and 35. The open edge of the frame X is the lower edge, and that of the frame X' the upper edge, in this example, so that they face each other, whereby a plate, Y, secured between said edges and closing the entrance by which the glass was inserted in said frames, securely locks the glass panes in said frames. This plate is detachable, being secured to the back of the front plate of the casing B by two screws, $y\ y$, for example. The glass pane $x^2$, covering the window $B^6$, is inserted in its frame $X^2$, in this example, from below, the lower edge of said frame being the open edge in this example. In order to lock all the panes in their respective casings by a single fastening-plate, the plate Y is provided with an extension-piece, Y', the upper edge of which is bent forward to bear upon the glass $x^2$ near its lower edge, and also at its edge next the center of the machine. (See Figs. 31 and 32.) The glass $x^2$ covers only the opening $B^6$, and does not extend the whole length of the frame $X^2$, through which in this example the resetting key-hole is formed. The glass panes, when inserted in their frames or casing, are thus securely locked therein by a single detachable fastening, while if any or all of said panes are broken all that is necessary to replace them is to remove the broken pane or panes, slide in new ones, and fasten down the plate Y by screws or other suitable fastenings. Inasmuch as the fastening-plate is on the inside of the casing and is fastened from the inside, it is necessary to obtain access to the casing to remove the panes or substitute new ones. Hence fraudulent tampering with the machine without exposure through the windows of the casing is prevented.

My present improvements are more particularly designed, as before stated, to provide such an organization of checks or monitors upon the conductor that certain exposure will follow his failure to properly actuate the registering-machine for each fare collected by him, and that when the fares are registered he cannot manipulate the machine so as to be able to return a false account of receipts and be the gainer by such fraudulent transaction.

I have described all my improvements as organized in the best way known to me when embodied in a single machine. As I have said, the details may be varied, and some of my improvements used without the others. Some of my improvements will be of especial advantage in connection with machines not embodying the others.

Some of the changes that may be made without a departure from my invention will be obvious to skillful mechanicians and constructors of registering apparatus, while the great advantages of my improvements as a fare-register will also be readily appreciated by those familiar with the use of fare-registering machinery.

I claim as my invention—

1. The combination, with the inclosing-casing, of a hinged bottom provided with a locking-bolt, an upwardly-projecting rib near its rear edge fitted inside the back plate of the casing, and with interlocking connections with a hinged door of said casing at the front of the machine when said door is closed, substantially as described.

2. The combination, with the inclosing-casing, of a hinged bottom, a locking-bolt carried by said bottom, a hinged door, and a connection of said door to operate said locking-bolt when said door is closed, whereby the hinged bottom is locked by the closing movement of said door, substantially as described.

3. The hinged door of the casing provided with a spring-lock, and with a catch to retain the bolt of said lock when retracted, and said casing with a releasing projection by which the bolt of said lock is released on the closing of the door, so as to lock said door, substantially as described.

4. The combination, with the inclosed mechanism of a fare-register, of the register-casing having a hinged bottom and a hinged door, each of which is provided with an independent locking-bolt, so as to be independently locked to the casing, and an interlocking connection between the edges of said hinged portions when closed, substantially as described.

5. The combination of the casing provided with a hinged door and a hinged bottom, a bolt of said bottom, a spring-lock of said door, a catch to retain the bolt of said lock when retracted, and a releasing projection of said casing, whereby, on closing said door, the bolt of the hinged bottom is thrown into its locking position and the bolt of the lock of said door is released, so as to lock said door.

6. The combination, with the register-casing, of the hinged door, the lock of said door on the interior thereof, the hinged seal-cover carried by said door on its outer side to inclose a destructible seal which covers the key-hole of said lock, and said seal-cover being locked to the door by the same mechanism that locks said hinged door to said casing, substantially as described.

7. The combination of the casing having a hinged door permitting access thereto, the spring-lock of said door, a catch to retain the bolt of said lock when retracted, the releasing projection of said casing to release the bolt of said lock on the closing of the door, so as to lock said door, the seal-cover carried by said door to inclose a seal covering the key-hole of said spring-lock, and a locking portion of said seal-cover engaged by said bolt when in its locking position, substantially as described, whereby the closing of the door automatically locks it and the seal-cover carried by it.

8. The combination, with the open or slotted back plate of the register-casing and the suspension and locking hooks, of a slide-bolt engaging said locking hook to lock the register in its stationary position, and a pivoted lever to operate said bolt, substantially as described.

9. The combination, with an open or slotted back plate of a register casing, of a supporting and locking connection or connections, a locking device inclosed within said casing and engaging said locking connection to lock the register in position, and a door of said casing by which access is permitted to said locking device, engaging said locking device, on the closing of the door, to move said device to its locking position, substantially as described.

10. The register-casing provided with two or more skeleton frames in the front plate thereof, each of said frames being open at one edge for the insertion and removal of the panes of glass covering the openings in said casing, in combination with a detachable fastening-plate fitted in said casing between said frames and opposing the open edges thereof, whereby said panes are securely fastened in place to prevent unauthorized access to the casing by means of a single fastening-plate, while they may be readily removed and replaced on obtaining access to the interior of the casing, substantially as described.

11. The combination, with a non-rotating post projecting from the base-plate of the casing, of the main actuating-lever fitted at its inner end to turn about said post as an axis, a rigid detachable non-rotating sleeve fitted upon said post in front of said lever and acting thereon to keep said lever in position, and a detachable fastening between the front end of said sleeve and said post, substantially as described.

12. The combination, with a fixed post projecting from the base-plate of the register, of the main actuating-lever fitted at its inner end to turn about said post as an axis, a sleeve fitted upon said post in front of said lever, and detachable interlocking fastenings for said sleeve, whereby it is locked to said post, both as against endwise and turning movements.

13. The combination of a post projecting from the base-plate of the register, a detachable non-rotating bearing-sleeve fitted upon said post, and a detachable fastening for said sleeve, whereby it may be readily removed, while securely locked in place on the post in use without rotation or endwise movement, substantially as described.

14. The combination, with a post projecting from the back plate of the register-casing, of a non-rotating detachable bearing-sleeve mounted on said post, fastening-connections between said post and sleeve, and a second sleeve carrying a register-wheel or disk mounted on said non-rotating bearing-sleeve so as to turn thereon in the counting operation of the register, substantially as described, whereby there is interposed between the post and the rotating wheel or disk a non-rotating bearing-sleeve which may be readily removed and replaced, while the wheel or disk mounted thereon is insured against being interfered with or moved by other parts of the machine mounted on said post.

15. The combination, with a post projecting from the back plate of the register-casing, of a detachable sleeve mounted thereon so as to be incapable of turning or endwise movements, and provided at its inner or lower end with an enlarged or tapered surface, and a second sleeve mounted upon said detachable sleeve so as to turn around it, and provided at its inner or lower end with an enlarged or tapered mouth to fit said enlarged or tapered surface of the detachable sleeve, substantially as described.

16. The combination, with a post projecting from the back plate of the register-casing, of a non-rotating detachable bearing-sleeve mounted on said post, a locking-connection between said sleeve and said post which prevents turning or endwise movement of said sleeve in the operation of the machine, a rotatable sleeve carrying a register wheel or disk mounted so as to turn on said non-rotating sleeve in the counting process, and a locking-connection between said rotating and non-rotating sleeves which permits the one to turn on the other without endwise movement, substantially as described.

17. The combination, with a post projecting from the base-plate of the casing, of a bell mounted upon said post so as to rest against the shoulder of said post on one side, a non-rotating detachable bearing-sleeve also mounted on said post in front of said bell and bearing thereon to retain it against said shoulder, and a rotatable sleeve carrying a register wheel or disk mounted on said non-rotating sleeve as an axis, substantially as described, whereby space is economized, the bell firmly retained in position, and a fixed axis furnished to a rotating register-wheel, without danger of interference between said wheel and said bell.

18. The combination of a post projecting from the base plate of the register, a perforated bell mounted on said post so as to rest against the shoulder thereof and be capable of turning on the post, and an adjustable interlocking connection between said post and said bell, substantially as described.

19. The combination of a post with a bell mounted thereon by an opening which permits the passage of the end of the post, said bell being provided with a series of holes concentric with said post to receive a pin projecting therefrom, whereby the bell is locked upon the post as against turning movement, while it may be readily disengaged from the locking-pin of the post to adjust it relatively to the bell-hammer.

20. The combination of a post, a bell mounted on said post having a series of holes, one of which is engaged by a pin or projection on said post so as to lock the bell and post together as against turning movements, and a detachable sleeve also mounted on said post to keep the bell in place while in operation, substantially as described.

21. The combination of a sleeve fitted to turn about a post or axis with a register disk or dial, by means of a sliding detachable interlocking connection between said sleeve and said disk or dial, substantially as described.

22. The combination of a sleeve fitted to turn about a post or axis having a tapered or beveled and undercut or dovetailed front end, with a register disk or dial having a correspondingly-shaped slot therein, whereby the dial is fitted upon the tapered end of the sleeve and locked thereon, so as to be readily removable by engaging the side walls of the slot in the disk with said undercut end of the sleeve, substantially as described.

23. The combination of a sleeve fitted to turn about a post or axis having a tapered or beveled and undercut or dovetailed front end, a register disk or dial having a correspondingly-shaped slot therein, whereby the dial is fitted upon the end of the sleeve and interlocked by a sliding movement with said undercut end of said sleeve, and a fastening to secure the disk and sleeve together in the interlocking contact, substantially as described.

24. In a registering apparatus, the combination of a disk or dial having the numerals or figures thereon arranged to lie at an angle to the radius of the disk, with another disk or dial having the numerals or figures thereof arranged radially thereon, substantially as described, whereby large disks and large numerals or figures may be employed in small space, while the particular numerals or figures of the disks which are to show the count or tally may be brought close together vertically, so as to be plainly viewed through a comparatively small window in front of said disks.

25. The combination of two disks having numerals or figures thereon arranged to lie at an angle to a line drawn radially from the center of the disks with and overlapping a central disk, the figures of which are radial to the axis of the disk, whereby the numbers of the disks which are to show the count or tally may be brought close together and be inspected through a comparatively small window in front of said disks, substantially as described.

26. The combination of an actuating-wheel and a sleeve, both fitted to turn about a shaft or post, with a rocking driving connection or coupling between the two, whereby the wheel and sleeve may be connected together, so that the operation of the actuating-wheel operates or drives the sleeve or may be disconnected to permit the independent operation of said sleeve.

27. The combination of an actuating-wheel and a sleeve, both fitted to turn about a shaft or post, a rocking driving connection or coupling between the two by which they may be coupled together or disconnected, and a spring acting upon said rocking connection to normally couple said wheel and sleeve together, substantially as described.

28. The combination of an actuating-wheel and a sleeve carrying a register wheel or disk, both said actuating-wheel and said sleeve being fitted to turn about a shaft or post as an axis, and said post having a recessed front end, a rocking driving connection or coupling between said sleeve and actuating-wheel, a rod through which said driving-connection is operated, and a key having an end to fit the recess in the end of the shaft, and a bit to engage said rod by which the rocking connection is operated, substantially as described.

29. The combination of an actuating-wheel and a sleeve carrying a register-disk, both said actuating-wheel and said sleeve being mounted to turn about a shaft or post as an axis, with a rocking driving-connection between said wheel and sleeve and a key to operate said connection, said key being provided with a bit through which said connection is operated, and with a shoulder to engage said sleeve to lock the key and sleeve together.

30. The combination of a resetting-key provided with a locking or shouldered bit, with a sleeve which carries the trip-disk having a recess in which the shoulder of said bit fits to afford a firm connection between the key and sleeve, substantially as described.

31. The combination of the trip-register, the general register, the main actuating-lever, the driving-pawl of said lever engaging with the teeth of the main actuating-wheel to operate both said trip and said general registers step by step in the process of counting, the gearing between said actuating-wheel and said general register, a rocking lever-connection between said main actuating-wheel and said trip-register, and a key to operate said lever-connection, whereby, in the process of counting, the trip and general registers register concurrently, while the trip-register may be disconnected from the general register, so as to be turned or reset independently thereof.

32. The combination, with a feed-roller and an actuating ratchet-wheel to give motion to said feed-roller, of an actuating-lever to operate said feed-roller step by step by acting on said ratchet-wheel, and having the capacity of rocking and of moving endwise slightly on its pivot or fulcrum, substantially as described.

33. The combination, with a ratchet-wheel and a pivoted lever having a point or tooth engaging with said ratchet-wheel to operate it step by step, of a main actuating-lever operating said pivoted lever and connected therewith by rollers or surfaces on said main actuating-lever, between which said pivoted lever lies so as to be capable of movement between them, substantially as described.

34. The combination, with a trip-register, of a recording strip or band feeding mechanism, a punch relatively to which said strip or band is fed, an actuating-lever and pivotal connections between said lever and said register, and feeding mechanism and punch to operate the same at one stroke of the lever, so that for each actuation of said lever a count or tally is made on the register, the recording strip or device is fed to present a new surface to be punched, and said punch is operated to punch said strip or device, substantially as described.

35. The combination of a trip-register, a general register, an endwise-movable strip or band feeding mechanism, and a punch relatively to which said band-feeding mechanism moves, with operating-connections for operating said registers, feeding mechanism, and punch concurrently, substantially as described, whereby the general register shows in the aggregate all the fares registered, the trip-register registers the fares for each trip only, while a band or strip fed by said band feeding mechanism also shows by a series of holes or perforations the fares registered, and constitutes a permanent record thereof.

36. The combination, with a punch, of a band or strip feeding mechanism having a concurrently-operated feed-roller and a feed-screw geared together and operated through the medium of a ratchet-wheel, whereby the screw feeds the band-feeding mechanism endwise, while the feed-roller imparts endwise movement to the recording band or strip carried by said band-feeding mechanism.

37. The combination, with a turning shaft provided with a ratchet-wheel through which the shaft is turned and with a lever to operate said ratchet-wheel, of a feed-roller mounted on said shaft so as to turn therewith while capable of endwise movement thereon, substantially as described.

38. The combination, with a turning shaft, of a feed-roller mounted on said shaft so as to turn therewith while capable of endwise movement thereon, a frame in which said feed-roller is carried, a screw geared with said turning shaft, and threads on said frame meshing with said screw, so that the rotation of the screw feeds said frame endwise while the rotation of the feed-roller imparts endwise movement to the recording band or strip carried by said frame.

39. A band or strip feeding mechanism having a pivoted threaded jaw or jaws meshing with a feed-screw, whereby, when said jaws are closed upon the screw and the screw is turned, the band-feeding mechanism will be moved endwise, while when said jaws are open or released said endwise movement will cease.

40. The combination of an endwise-movable band or strip feeding mechanism with a feed-screw by means of pivoted spring-jaws having threads adapted to mesh with the threads of said screw when said jaws are closed against the force of their spring or springs, substantially as described.

41. The combination, with an endwise-movable band or strip feeding mechanism having pivoted jaws to mesh with a feed-screw, of a tongue or wedge to engage said jaws to close them upon the feed-screw, substantially as described.

42. The combination, with an endwise-movable band or strip feeding mechanism having pivoted jaws to mesh with the feed-screw, of a hinged door of a casing inclosing said mechanism, provided with a tongue to engage said jaws when the door is closed to close them upon said screw.

43. The combination, with an endwise-movable band or strip feeding mechanism having pivoted jaws to mesh with a feed-screw, of a hinged door of a casing inclosing said mechanism, provided with a jointed or pivoted tongue adapted to engage said jaws to close them upon the screw.

44. The combination, with an endwise movable band or strip feeding mechanism having pivoted jaws to mesh with a feed-screw, of a tongue to engage said jaws to close them upon the feed-screw, said tongue having a recess by which said jaws are released from said screw, substantially as described.

45. The combination, with an endwise-movable band or strip feeding mechanism having pivoted jaws to mesh with the feed-screw, of a hinged door of the casing inclosing said mechanism, provided with a pivoted and spring-actuated tongue to engage said jaws to close them upon said feed-screw, substantially as described.

46. The combination, substantially as hereinbefore set forth, of an endwise-movable band or strip feeding mechanism, a rotatable feed-screw operating said mechanism, an operating-connection between said mechanism and said feed-screw, and a device which releases said mechanism from endwise movement when the limit of said movement is reached in the operation of the machine.

47. A band or strip feeding mechanism movable endwise transversely, or crosswise of the line of motion of the strip or band thereof, and having a guide or carrier through which the band or strip is fed lengthwise, in combination with a recording band or strip, and with a guide or guides for said feeding mechanism, and mechanism to move said feeding mechanism endwise transversely, or crosswise of the line of motion of the band or strip through its guide or carrier, substantially as described.

48. A band or strip feeding mechanism movable endwise transversely, or crosswise of the line of motion of the strip or band, and having a guide or carrier through which the band or strip is fed lengthwise, in combination with a recording band or strip, and with a guide or guides for said feeding mechanism, and mechanism operated concurrently with said feeding mechanism and by the same prime mover to move said feeding mechanism gradually crosswise of the line of motion of the strip or band, substantially as described.

49. The combination, with an endless recording band and guides or rollers around which it is stretched and fed, of a feeding mechanism for said band having a guide or carrier through which said band travels, said guide or carrier being fitted to move in guides crosswise or transversely to the line of the feeding motion of the said band in said carrier, and means for moving said guide or carrier transversely, substantially as described, whereby the band is fed continuously, and also moved edgewise or transversely, for the purpose described.

50. The combination, with a recording band or strip and guides or rollers therefor around which it is fed, and with feeding mechanism for said band or strip, having a guide or carrier through which the band or strip travels, and said guide or carrier being fitted to move crosswise or transversely to the line of the lengthwise feeding motion of said band or strip, and with means for moving said guide or carrier transversely, of a punch relatively to which said band or strip is fed both longitudinally and laterally, substantially as described.

51. The combination, with a recording strip or band and guides or rollers therefor around which it is fed, and with feeding mechanism for said band or strip, having a guide or carrier through which the band or strip travels, and said guide or carrier being fitted to move crosswise or transversely to the line of the lengthwise feeding motion of said band or strip, and with means for moving said guide or carrier transversely, of a punch relatively to which said strip is fed longitudinally and laterally, registering mechanism, an actuator or prime mover, and operating-connections between said actuator and said feeding mechanism, punch, and register, substantially as described, whereby the counting operations of the register are recorded on said strip or band by the action of the punch to constitute a record independent of that of said register of said counting operations.

52. In a strip or band feeding mechanism, a band guide or carrier having a spring jaw or member with a headed or shouldered end, by the movement of which the edge of the guide or carrier may be opened or closed to permit the insertion in or removal from said guide or carrier of a strip or band when open, and retain said strip or band in place when closed, substantially as described.

53. The endwise-movable band or strip feeding mechanism having a band guide or carrier adapted to be opened and closed, substantially as described.

54. A band or strip feeding mechanism having a band guide or carrier to be opened and closed, with a hinged gate or frame connected with a member of said guide or carrier to positively open said carrier by the movement of said gate or frame, substantially as described.

55. A band or strip feeding mechanism having a band guide or carrier to be opened and closed, with a hinged gate or frame connected with a member of said guide to positively open it, and a locking device to lock said gate or frame with the band-guide open, substantially as described.

56. The combination, with a band or strip feeding mechanism having a band guide or carrier adapted to open and close and two feed-rollers, one of which is adjustable toward and from the other, so as to make or break feeding-contact with a band or strip, of locking mechanism acting to lock said rollers in feeding-contact in the operation of the machine and to lock or hold them apart when separated from said feeding-contact, and also to lock the band guide or carrier in its open position when the band or strip is to be removed or replaced and said feed-rollers consequently separated, substantially as described.

57. In a band or strip feeding mechanism, the combination of an endwise but not laterally movable roller with a secondary roller movable both endwise and laterally, substantially as described.

58. In a band or strip feeding mechanism, the combination of an endwise but not laterally movable roller carried by an endwise-movable frame with a secondary feed-roller mounted in a pivoted gate or frame so as to be moved endwise therein in unison with the main feed-roller when the two are in feeding-contact, substantially as described, whereby, on closing said gate or frame, the secondary roller will be brought into feeding contact with the main feed-roller and be also carried within the endwise-movable frame of said roller, so as to be moved therewith, while, when said gate or frame of the secondary roller is opened, the rollers will be separated to permit of the insertion or withdrawal of a recording band or strip.

59. In a band or strip feeding mechanism, the combination of two feed-rollers movable endwise in feeding-contact with a band or strip between them, with mechanism for imparting a revolving and endwise movement to said rollers, substantially as described.

60. The combination, with feeding mechanism having two feed-rollers and an actuator or prime mover to operate said rollers intermittingly step by step, of an endless recording-band fed by and between said rollers, and guides independent of said feed-rollers over which said band is stretched and around which it travels continuously by the feeding action of said rollers, substantially as described.

61. The combination, with feeding mechanism having two feed-rollers, of an endless recording-band fed by and between said rollers, guides independent of said feed-rollers over which said band is stretched and around which it travels continuously by the feeding-action of said rollers, and a punch relatively to which one side of said band is fed to be successively punched, substantially as described.

62. The combination, with endwise-movable band or strip feeding mechanism having a band guide or carrier capable of being opened, of mechanism which prevents the opening of said guide or carrier and the removal of the band or strip prior to the return of the said feeding mechanism to its starting-point, substantially as described.

63. The combination, with an endwise-movable band or strip feeding mechanism, of the hinged gate or frame which must be opened to permit of the insertion or removal of a recording band or strip, with connection between said feeding mechanism and said gate or frame which necessitates the adjustment of the feeding mechanism to its starting-position prior to the opening of said frame, substantially as described, whereby the starting of the feed mechanism from the proper point, when a fresh band or strip has been inserted therein, is insured.

64. The combination, with a band or strip feeding mechanism having two feed-rollers between which the band or strip is fed, and a ratchet-wheel to operate said rollers, of two independent devices for operating said ratchet-wheel, substantially as described.

65. The combination, with a strip or band feeding mechanism, of two independent devices for operating said feeding mechanism, a trip-register, an actuator to actuate said trip-register in the counting process, and a resetting mechanism to reset said trip-register to zero or the starting-point, said actuator operating the feed mechanism through one of said independent devices, and the resetting mechanism of the trip-register operating said feeding mechanism through the other of said devices, substantially as described.

66. The combination, with a band or strip feeding mechanism, of a spacing slide or device to actuate said mechanism and mechanism to operate said spacing-slide, substantially as described.

67. The combination of a trip-register, a band or strip feeding mechanism, a punch, an actuator for operating said trip-register, feeding mechanism, and punch, and an independent device or spacing-slide operated to move said feeding mechanism independently of said actuator and punch, substantially as described.

68. The endwise and laterally movable spacing-slide and mechanism to operate it, in combination with a band or strip feeding mechanism, substantially as described.

69. The combination of the endwise and laterally movable spacing-slide, the trip-register, and the band or strip feeding mechanism, whereby when said trip-register is reset, said spacing-slide is operated to move said feeding mechanism to form a division-space between the recording perforations in the band or strip, while successive rotations, prior to reaching the zero or starting point, do not affect said slide, which is operated but once to form a blank space on the band for each resetting movement of the trip-register.

70. The combination, with a band or strip feeding mechanism, of a trip-register, an actuating-lever for said trip-register and said feeding mechanism, a resetting mechanism to reset said trip-register to the zero or starting point, and the spacing-slide operated by said resetting mechanism when the trip-register is being reset so as to move said feeding mechanism, and retracted by said actuating-lever after the resetting operation has been completed by the first counting actuation of said actuating-lever, substantially as described.

71. The combination, with a trip-register adapted to be set to the zero or starting point independently of the main actuator thereof, of a zero-stop mechanism to stop said trip-register at zero when being reset, a pawl which prevents said register being reset save in one direction, and a connection between said zero-stop and said pawl, whereby the retraction of said zero-stop to permit of the counting operation of the machine also releases the said pawl to permit the trip-register to be turned in a forward or counting direction, substantially as described.

72. A progressive zero-stop, substantially as described, whereby the disks or wheels of the trip-register are successively locked with their zero-points opposite their window or windows.

73. In combination with two or more wheels or disks of a trip-register provided with notched or recessed carrying devices, a progressive zero-stop which successively locks said wheels or disks by engaging said notches or recesses with their zero-points opposite their window or windows, substantially as described.

74. In combination with a trip disk or wheel and resetting mechanism therefor, a sliding zero-stop to stop said disk or wheel at zero when being reset.

75. The combination, with the notched or recessed wheels or disks of the trip-register, of the sliding zero-stop having locking portions or lugs which successively enter the notches in the several disk-carrying devices, substantially as described.

76. In combination with a trip-register, a zero-stop having a lug or projection thereon, and mechanism to act on said projection to retract said zero-stop from engagement with said register, substantially as described.

77. In combination with a trip-register, a zero-stop having a lug or projection thereon by which to retract it from engagement with said register, and another lug or projection by which said zero-stop may be partially retracted independently of the first-mentioned lug, substantially as described.

78. In combination, a trip-register with a retractible zero-stop and a main actuator-locking mechanism connected so as to be movable together, substantially as described, whereby, when said zero-stop is released to act upon the register when being reset, the main actuator by which said trip-register is operated in the counting process is locked from a counting movement, while when said zero-stop is retracted said main actuator is released.

79. In combination with a trip-register, a sliding zero-stop connected with a main actuator-locking mechanism, substantially as described, whereby, when said sliding zero-stop is retracted, the main actuator is released and may be operated in the counting process.

80. In combination with a trip-register and its main actuator which operates it in the counting process, a main actuator-locking mechanism having a lug or projection, and a rotary portion of a lock acting on said projection to retract said locking mechanism, substantially as described.

81. The combination, with a trip-register adapted to be reset by a key, of a direction-indicator having a key-hole for the passage of the key to said register.

82. The combination, with a trip-register adapted to be reset by a key passing through the casing of said register, of a movable direction-indicator having a key-hole therein for the passage of the resetting-key to the trip-register, whereby the trip-register cannot be reset until said key-hole of the direction-indicator is in line with that in the casing, substantially as described.

83. A rectilinearly-sliding direction indicator having a rack thereon, in combination with a pinion meshing with said rack to shift the indicator, substantially as described.

84. A movable direction-indicator in combination with and controlling the operations of the zero-stop, substantially as described.

85. The combination of a trip-register, a zero-stop therefor, a device limiting the resetting movement of the trip register to one direction, and a direction-indicator controlling the movements of said zero-stop and said device, substantially as described.

86. A direction-indicator provided with inclined or cam faces, in combination with a zero-stop having a projection or lug acted on by said inclined or cam faces of the indicator, substantially as described.

87. The combination, with the main actuator of the machine, of a locking device or bolt for said actuator, a direction-indicator, and a connection between said locking-bolt and said indicator by which the locking device is controlled—that is, thrown both into and out of locking connection relatively to said actuator by the movement of said indicator—substantially as described.

88. The combination of a direction-indicator and a locking mechanism for the main actuating-lever of the machine, controlled by said indicator, with a lock adapted to retract said locking mechanism when only partially released by the indicator, substantially as described.

89. The combination, with a direction-indicator having a notched or toothed flange, of a locking device of the main actuator, having a tooth to engage said notched flange when said locking device is partially released by a partial movement of said indicator, and a lock a rotary portion of which acts upon said locking device to retract it and permit the indicator to be moved back to the position it previously occupied, substantially as described.

90. The combination of a trip-register, the direction-indicator, an actuator of the trip-register, the zero-stop slide, a locking device of the main actuator, the connections between said indicator and said zero-stop slide and said actuator-locking device, and a lock also capable of acting on said zero-stop slide and said locking device when only a partial movement of the indicator is effected, substantially as described.

91. The combination, with the casing having a window through which inspection may be had, of a trip-register, a direction-indicator opposite said window, said indicator and said casing having holes therein for the passage of a resetting-key to said trip-register, a device for shifting said indicator a portion only of its movement to bring said key-holes in line to permit of a resetting operation by said resetting-key, a zero stop controlled by the movements of said indicator so that it will act upon the trip-register when in condition for a resetting operation, and a device, also controlled by said indicator, for limiting the resetting movement of the trip-register to a backward direction, substantially as described.

In testimony whereof I have hereunto subscribed my name this 4th day of January, A. D. 1883.

JOSEPH CORBETT.

Witnesses:
WM. J PEYTON,
JOHN F. COURTNEY.